(12) United States Patent
Gass et al.

(10) Patent No.: US 7,472,634 B2
(45) Date of Patent: Jan. 6, 2009

(54) WOODWORKING MACHINES WITH OVERMOLDED ARBORS

(75) Inventors: Stephen F. Gass, Wilsonville, OR (US); J. David Fulmer, Tualatin, OR (US); David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 417 days.

(21) Appl. No.: 10/923,290

(22) Filed: Aug. 20, 2004

(65) Prior Publication Data

US 2005/0039822 A1 Feb. 24, 2005

Related U.S. Application Data

(60) Provisional application No. 60/496,550, filed on Aug. 20, 2003.

(51) Int. Cl.
*B27B 13/00* (2006.01)
*B23D 19/00* (2006.01)

(52) U.S. Cl. .................... 83/58; 83/62.1; 83/471.3; 83/477.1

(58) Field of Classification Search .............. 83/62.1, 83/58, 471.3, 477.1, 490, 397, 589, 581, 83/397.1, 477.2, DIG. 1, 630, 297, 644; 324/678, 658, 660, 725, 706, 686; 192/55.2–55.7
See application file for complete search history.

(56) References Cited

U.S. PATENT DOCUMENTS

| 146,886 A | 1/1874 | Doane et al. |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlmann et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |

(Continued)

FOREIGN PATENT DOCUMENTS

CA 2140991 1/1995

(Continued)

OTHER PUBLICATIONS

Gordon Engineering Corp., Product Catalog, Oct. 1997, pp. cover, 1, 3 and back, Brookfield, Connecticut, US.

(Continued)

*Primary Examiner*—Ghassem Alie

(57) ABSTRACT

Power equipment with various safety systems is disclosed. Table saws with safety systems and/or blade retraction are disclosed. Over-molded arbors are disclosed for use in power equipment with safety systems and/or blade retraction.

8 Claims, 15 Drawing Sheets

U.S. PATENT DOCUMENTS

| | | |
|---|---|---|
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 15,262 A | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Oceanasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odium et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,007,501 A | 11/1961 | Mundell et al. |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |

| | | | | | |
|---|---|---|---|---|---|
| 3,213,731 A | 10/1965 | Renard | 3,994,192 A | 11/1976 | Faig |
| 3,224,474 A | 12/1965 | Bloom | 4,007,679 A | 2/1977 | Edwards |
| 3,232,326 A | 2/1966 | Speer et al. | 4,016,490 A | 4/1977 | Weckenmann et al. |
| 3,246,205 A | 4/1966 | Miller | 4,026,174 A | 5/1977 | Fierro |
| 3,249,134 A | 5/1966 | Vogl et al. | 4,026,177 A | 5/1977 | Lokey |
| 3,274,876 A | 9/1966 | Debus | 4,029,159 A | 6/1977 | Nymann |
| 3,276,497 A | 10/1966 | Heer | 4,047,156 A | 9/1977 | Atkins |
| 3,306,149 A | 2/1967 | John | 4,048,886 A | 9/1977 | Zettler |
| 3,313,185 A | 4/1967 | Drake et al. | 4,060,160 A | 11/1977 | Lieber |
| 3,315,715 A | 4/1967 | Mytinger | 4,070,940 A | 1/1978 | McDaniel et al. |
| 3,323,814 A | 6/1967 | Phillips | 4,075,961 A | 2/1978 | Harris |
| 3,337,008 A | 8/1967 | Trachte | 4,077,161 A | 3/1978 | Wyle et al. |
| 3,356,111 A | 12/1967 | Mitchell | 4,085,303 A | 4/1978 | McIntyre et al. |
| 3,368,596 A | 2/1968 | Comer | 4,090,345 A | 5/1978 | Harkness |
| 3,386,322 A | 6/1968 | Stone et al. | 4,091,698 A | 5/1978 | Obear et al. |
| 3,439,183 A | 4/1969 | Hurst, Jr. | 4,106,378 A | 8/1978 | Kaiser |
| 3,445,835 A | 5/1969 | Fudaley | 4,117,752 A | 10/1978 | Yoneda |
| 3,454,286 A | 7/1969 | Anderson et al. | 4,145,940 A | 3/1979 | Woloveke et al. |
| 3,456,696 A | 7/1969 | Gregory et al. | 4,152,833 A | 5/1979 | Phillips |
| 3,512,440 A | 5/1970 | Frydmann | 4,161,649 A | 7/1979 | Klos et al. |
| 3,538,964 A | 11/1970 | Warrick et al. | 4,175,452 A | 11/1979 | Idel |
| 3,540,338 A | 11/1970 | McEwan et al. | 4,184,394 A | 1/1980 | Gjerde |
| 3,554,067 A | 1/1971 | Scutella | 4,190,000 A | 2/1980 | Shaull et al. |
| 3,566,996 A | 3/1971 | Crossman | 4,195,722 A | 4/1980 | Anderson et al. |
| 3,580,376 A | 5/1971 | Loshbough | 4,199,930 A | 4/1980 | Lebet et al. |
| 3,581,784 A | 6/1971 | Warrick | 4,200,002 A | 4/1980 | Takahashi |
| 3,593,266 A | 7/1971 | Van Sickle | 4,206,666 A | 6/1980 | Ashton |
| 3,613,748 A | 10/1971 | De Pue | 4,206,910 A | 6/1980 | Biesemeyer |
| 3,621,894 A | 11/1971 | Niksich | 4,249,117 A | 2/1981 | Leukhardt et al. |
| 3,648,126 A * | 3/1972 | Boos et al. .................. 361/502 | 4,249,442 A | 2/1981 | Fittery |
| 3,670,788 A | 6/1972 | Pollak et al. | 4,251,599 A * | 2/1981 | McCormick ................ 428/682 |
| 3,675,444 A | 7/1972 | Whipple | 4,255,995 A | 3/1981 | Connor |
| 3,680,609 A | 8/1972 | Menge | 4,262,278 A | 4/1981 | Howard et al. |
| 3,688,815 A | 9/1972 | Ridenour | 4,267,914 A | 5/1981 | Saar |
| 3,695,116 A | 10/1972 | Baur | 4,270,427 A | 6/1981 | Colberg et al. |
| 3,696,844 A | 10/1972 | Bernatschek | 4,276,459 A | 6/1981 | Willett et al. |
| 3,716,113 A | 2/1973 | Kobayashi et al. | 4,276,799 A | 7/1981 | Muehling |
| 3,719,103 A | 3/1973 | Streander | 4,291,794 A | 9/1981 | Bauer |
| 3,740,000 A | 6/1973 | Takada | 4,305,442 A | 12/1981 | Currie |
| 3,745,546 A | 7/1973 | Struger et al. | 4,319,146 A | 3/1982 | Wires, Sr. |
| 3,749,933 A | 7/1973 | Davidson | 4,321,841 A | 3/1982 | Felix |
| 3,754,493 A | 8/1973 | Niehaus et al. | 4,334,450 A | 6/1982 | Benuzzi |
| 3,772,590 A | 11/1973 | Mikulecky et al. | 4,372,202 A | 2/1983 | Cameron |
| 3,785,230 A | 1/1974 | Lokey | 4,374,552 A | 2/1983 | Dayen |
| 3,793,915 A | 2/1974 | Hujer | 4,385,539 A | 5/1983 | Meyerhoefer et al. |
| 3,805,639 A | 4/1974 | Peter | 4,391,358 A | 7/1983 | Haeger |
| 3,805,658 A | 4/1974 | Scott et al. | 4,418,597 A | 12/1983 | Krusemark et al. |
| 3,808,932 A | 5/1974 | Russell | 4,427,042 A | 1/1984 | Mitchell et al. |
| 3,829,850 A | 8/1974 | Guetersloh | 4,466,170 A | 8/1984 | Davis |
| 3,829,970 A | 8/1974 | Anderson | 4,466,233 A | 8/1984 | Thesman |
| 3,858,095 A | 12/1974 | Friemann et al. | 4,470,046 A | 9/1984 | Betsill |
| 3,861,016 A | 1/1975 | Johnson et al. | 4,492,291 A | 1/1985 | Chometon et al. |
| 3,863,208 A | 1/1975 | Balban | 4,503,739 A | 3/1985 | Konieczka |
| 3,874,747 A | 4/1975 | Case et al. | 4,510,489 A | 4/1985 | Anderson, III et al. |
| 3,880,032 A | 4/1975 | Green | 4,512,224 A | 4/1985 | Terauchi |
| 3,882,744 A | 5/1975 | McCarroll | 4,518,043 A | 5/1985 | Anderson et al. |
| 3,886,413 A | 5/1975 | Dow et al. | 4,532,501 A | 7/1985 | Hoffman |
| 3,889,567 A | 6/1975 | Sato et al. | 4,532,844 A | 8/1985 | Chang et al. |
| 3,905,263 A | 9/1975 | Smith | 4,557,168 A | 12/1985 | Tokiwa |
| 3,922,785 A | 12/1975 | Fushiya | 4,559,858 A | 12/1985 | Laskowski et al. |
| 3,924,688 A | 12/1975 | Cooper et al. | 4,560,033 A | 12/1985 | DeWoody et al. |
| 3,931,727 A | 1/1976 | Luenser | 4,566,512 A | 1/1986 | Wilson |
| 3,935,777 A | 2/1976 | Bassett | 4,573,556 A | 3/1986 | Andreasson |
| 3,945,286 A | 3/1976 | Smith | 4,576,073 A | 3/1986 | Stinson |
| 3,946,631 A | 3/1976 | Malm | 4,589,047 A | 5/1986 | Gaus et al. |
| 3,947,734 A | 3/1976 | Fyler | 4,589,860 A | 5/1986 | Brandenstein et al. |
| 3,949,636 A | 4/1976 | Ball et al. | 4,599,597 A | 7/1986 | Rotbart |
| 3,953,770 A | 4/1976 | Hayashi | 4,599,927 A | 7/1986 | Eccardt et al. |
| 3,960,310 A | 6/1976 | Nussbaum | 4,606,251 A | 8/1986 | Boileau |
| 3,967,161 A | 6/1976 | Lichtblau | 4,615,247 A | 10/1986 | Berkeley |
| 3,974,565 A | 8/1976 | Ellis | 4,621,300 A | 11/1986 | Summerer |
| 3,975,600 A | 8/1976 | Marston | 4,625,604 A | 12/1986 | Handler et al. |
| 3,978,624 A | 9/1976 | Merkel et al. | 4,637,188 A | 1/1987 | Crothers |

| | | | | | |
|---|---|---|---|---|---|
| 4,637,289 A | 1/1987 | Ramsden | 5,321,230 A | 6/1994 | Shanklin et al. |
| 4,644,832 A | 2/1987 | Smith | 5,331,875 A | 7/1994 | Mayfield |
| 4,653,189 A | 3/1987 | Andreasson | 5,353,670 A | 10/1994 | Metzger, Jr. |
| 4,657,428 A | 4/1987 | Wiley | 5,377,554 A | 1/1995 | Reulein et al. |
| 4,661,797 A | 4/1987 | Schmall | 5,377,571 A | 1/1995 | Josephs |
| 4,672,500 A | 6/1987 | Tholome et al. | 5,392,568 A | 2/1995 | Howard, Jr. et al. |
| 4,675,664 A | 6/1987 | Cloutier et al. | 5,392,678 A | 2/1995 | Sasaki et al. |
| 4,679,719 A | 7/1987 | Kramer | 5,401,928 A | 3/1995 | Kelley |
| 4,694,721 A | 9/1987 | Brickner, Jr. | 5,411,221 A | 5/1995 | Collins et al. |
| 4,718,229 A | 1/1988 | Riley | 5,423,232 A | 6/1995 | Miller et al. |
| 4,721,023 A | 1/1988 | Bartlett et al. | 5,436,613 A | 7/1995 | Ghosh et al. |
| 4,722,021 A | 1/1988 | Hornung et al. | 5,447,085 A | 9/1995 | Gochnauer |
| 4,751,603 A | 6/1988 | Kwan | 5,451,750 A | 9/1995 | An |
| 4,756,220 A | 7/1988 | Olsen et al. | 5,453,903 A | 9/1995 | Chow |
| 4,757,881 A | 7/1988 | Jonsson et al. | 5,471,888 A | 12/1995 | McCormick |
| 4,774,866 A | 10/1988 | Dehari et al. | 5,480,009 A | 1/1996 | Wieland et al. |
| 4,792,965 A | 12/1988 | Morgan | 5,503,059 A | 4/1996 | Pacholok |
| 4,805,504 A | 2/1989 | Fushiya et al. | 5,510,587 A | 4/1996 | Reiter |
| 4,831,279 A | 5/1989 | Ingraham | 5,510,685 A | 4/1996 | Grasselli |
| 4,840,135 A | 6/1989 | Yamauchi | 5,513,548 A | 5/1996 | Garuglieri |
| 4,845,476 A | 7/1989 | Rangeard et al. | 5,531,147 A | 7/1996 | Serban |
| 4,864,455 A | 9/1989 | Shimomura et al. | 5,534,836 A | 7/1996 | Schenkel et al. |
| 4,875,398 A | 10/1989 | Taylor et al. | 5,572,916 A | 11/1996 | Takano |
| 4,888,869 A | 12/1989 | Leatherman | 5,587,618 A | 12/1996 | Hathaway |
| 4,896,607 A | 1/1990 | Hall et al. | 5,592,353 A | 1/1997 | Shinohara et al. |
| 4,906,962 A | 3/1990 | Duimstra | 5,606,889 A | 3/1997 | Bielinski et al. |
| 4,907,679 A | 3/1990 | Menke | 5,619,896 A | 4/1997 | Chen |
| 4,934,233 A | 6/1990 | Brundage et al. | 5,623,860 A | 4/1997 | Schoene et al. |
| 4,936,876 A | 6/1990 | Reyes | 5,647,258 A | 7/1997 | Brazell et al. |
| 4,937,554 A | 6/1990 | Herman | 5,648,644 A | 7/1997 | Nagel |
| 4,962,685 A | 10/1990 | Hagstrom | 5,659,454 A | 8/1997 | Vermesse |
| 4,964,450 A | 10/1990 | Hughes et al. | 5,667,152 A | 9/1997 | Mooring |
| 4,965,909 A | 10/1990 | McCullough et al. | 5,671,633 A | 9/1997 | Wagner |
| 4,969,063 A | 11/1990 | Scott et al. | 5,695,306 A | 12/1997 | Nygren, Jr. |
| 4,975,798 A | 12/1990 | Edwards et al. | 5,700,165 A | 12/1997 | Harris et al. |
| 5,020,406 A | 6/1991 | Sasaki et al. | 5,720,213 A | 2/1998 | Sberveglieri |
| 5,025,175 A | 6/1991 | Dubois, III | 5,722,308 A | 3/1998 | Ceroll et al. |
| 5,042,348 A | 8/1991 | Brundage et al. | 5,724,875 A | 3/1998 | Meredith et al. |
| 5,046,426 A | 9/1991 | Julien et al. | 5,730,165 A | 3/1998 | Philipp |
| 5,052,255 A | 10/1991 | Gaines | 5,741,048 A | 4/1998 | Eccleston |
| 5,074,047 A | 12/1991 | King | 5,755,148 A | 5/1998 | Stumpf et al. |
| 5,081,406 A | 1/1992 | Hughes et al. | 5,768,786 A | 6/1998 | Kane et al. |
| 5,082,316 A | 1/1992 | Wardlaw | 5,771,742 A | 6/1998 | Bokaie et al. |
| 5,083,973 A | 1/1992 | Townsend | 5,782,001 A | 7/1998 | Gray |
| 5,086,890 A | 2/1992 | Turczyn et al. | 5,787,779 A | 8/1998 | Garuglieri |
| 5,094,000 A | 3/1992 | Becht et al. | 5,791,057 A | 8/1998 | Nakamura et al. |
| 5,116,249 A | 5/1992 | Shiotani et al. | 5,791,223 A | 8/1998 | Lanzer |
| 5,119,555 A | 6/1992 | Johnson | 5,791,224 A | 8/1998 | Suzuki et al. |
| 5,122,091 A | 6/1992 | Townsend | 5,791,441 A | 8/1998 | Matos et al. |
| 5,123,317 A | 6/1992 | Barnes, Jr. et al. | 5,797,307 A | 8/1998 | Horton |
| 5,146,714 A | 9/1992 | Luber | 5,819,619 A | 10/1998 | Miller et al. |
| 5,174,349 A | 12/1992 | Svetlik et al. | 5,819,625 A | 10/1998 | Sberveglieri |
| 5,184,534 A | 2/1993 | Lee | 5,852,951 A | 12/1998 | Santi |
| 5,198,702 A | 3/1993 | McCullough et al. | 5,857,507 A | 1/1999 | Puzio et al. |
| 5,199,343 A | 4/1993 | OBanion | 5,861,809 A | 1/1999 | Eckstein et al. |
| 5,201,110 A | 4/1993 | Bane | 5,875,698 A | 3/1999 | Ceroll et al. |
| 5,201,684 A | 4/1993 | DeBois, III | 5,880,954 A | 3/1999 | Thomson et al. |
| 5,206,625 A | 4/1993 | Davis | 5,921,367 A | 7/1999 | Kashioka et al. |
| 5,207,253 A | 5/1993 | Hoshino et al. | 5,927,857 A | 7/1999 | Ceroll et al. |
| 5,212,621 A | 5/1993 | Panter | 5,930,096 A | 7/1999 | Kim |
| 5,218,189 A | 6/1993 | Hutchison | 5,937,720 A | 8/1999 | Itzov |
| 5,230,269 A | 7/1993 | Shiotani et al. | 5,942,975 A | 8/1999 | Sorensen |
| 5,231,359 A | 7/1993 | Masuda et al. | 5,943,932 A | 8/1999 | Sberveglieri |
| 5,231,906 A | 8/1993 | Kogej | 5,950,514 A | 9/1999 | Benedict et al. |
| 5,239,978 A | 8/1993 | Plangetis | 5,963,173 A | 10/1999 | Lian et al. |
| 5,245,879 A | 9/1993 | McKeon | 5,974,927 A | 11/1999 | Tsune |
| 5,257,570 A | 11/1993 | Shiotani et al. | 5,989,116 A | 11/1999 | Johnson et al. |
| 5,265,510 A | 11/1993 | Hoyer-Ellefsen | 6,009,782 A | 1/2000 | Tajima et al. |
| 5,272,946 A | 12/1993 | McCullough et al. | 6,018,284 A | 1/2000 | Rival et al. |
| 5,276,431 A | 1/1994 | Piccoli et al. | 6,037,729 A | 3/2000 | Woods et al. |
| 5,285,708 A | 2/1994 | Bosten et al. | 6,052,884 A | 4/2000 | Steckler et al. |
| 5,293,802 A | 3/1994 | Shiotani et al. | 6,062,121 A | 5/2000 | Ceroll et al. |
| 5,320,382 A | 6/1994 | Goldstein et al. | 6,070,484 A | 6/2000 | Sakamaki |

| | | | | | | |
|---|---|---|---|---|---|---|
| 6,095,092 | A | 8/2000 | Chou | 6,857,345 B2 | 2/2005 | Gass et al. |
| 6,112,785 | A | 9/2000 | Yu | 6,874,397 B2 | 4/2005 | Chang |
| 6,119,984 | A | 9/2000 | Devine | 6,874,399 B2 | 4/2005 | Lee |
| 6,133,818 | A | 10/2000 | Hsieh et al. | 6,883,397 B2 | 4/2005 | Kimizuka |
| 6,141,192 | A | 10/2000 | Garzon | 6,889,585 B1 | 5/2005 | Harris et al. |
| 6,148,504 | A | 11/2000 | Schmidt et al. | 6,920,814 B2 | 7/2005 | Gass et al. |
| 6,148,526 | A * | 11/2000 | Kirn et al. ............... 30/388 | 6,922,153 B2 | 7/2005 | Pierga et al. |
| 6,148,703 | A | 11/2000 | Ceroll et al. | 6,945,148 B2 | 9/2005 | Gass et al. |
| 6,150,826 | A | 11/2000 | Hokodate et al. | 6,945,149 B2 | 9/2005 | Gass et al. |
| 6,161,459 | A | 12/2000 | Ceroll et al. | 6,957,601 B2 | 10/2005 | Gass et al. |
| 6,170,370 | B1 | 1/2001 | Sommerville | 6,968,767 B2 | 11/2005 | Yu |
| 6,244,149 | B1 | 6/2001 | Ceroll et al. | 6,986,370 B1 | 1/2006 | Schoene et al. |
| 6,250,190 | B1 | 6/2001 | Ceroll et al. | 6,994,004 B2 | 2/2006 | Gass et al. |
| 6,257,061 | B1 | 7/2001 | Nonoyama et al. | 6,997,090 B2 | 2/2006 | Gass et al. |
| 6,283,002 | B1 | 9/2001 | Chiang | 7,000,514 B2 | 2/2006 | Gass et al. |
| 6,295,910 | B1 * | 10/2001 | Childs et al. ............ 83/698.11 | 7,024,975 B2 | 4/2006 | Gass et al. |
| 6,312,028 | B1 | 11/2001 | Wilkosz | 7,098,800 B2 | 8/2006 | Gass |
| 6,325,195 | B1 | 12/2001 | Doherty | 7,137,326 B2 | 11/2006 | Gass et al. |
| 6,330,848 | B1 | 12/2001 | Nishio et al. | 2001/0032534 A1 | 10/2001 | Cerroll et al. |
| 6,336,273 | B1 | 1/2002 | Nilsson et al. | 2002/0017178 A1 | 2/2002 | Gass et al. |
| 6,352,137 | B1 | 3/2002 | Stegall et al. | 2002/0017179 A1 | 2/2002 | Gass et al. |
| 6,357,328 | B1 | 3/2002 | Ceroll et al. | 2002/0017180 A1 | 2/2002 | Gass et al. |
| 6,361,092 | B1 | 3/2002 | Eagle et al. | 2002/0017181 A1 | 2/2002 | Gass et al. |
| 6,366,099 | B1 | 4/2002 | Reddi | 2002/0017182 A1 | 2/2002 | Gass et al. |
| 6,376,939 | B1 | 4/2002 | Suzuki et al. | 2002/0017183 A1 | 2/2002 | Gass et al. |
| 6,404,098 | B1 | 6/2002 | Kayama et al. | 2002/0017184 A1 | 2/2002 | Gass et al. |
| 6,405,624 | B2 | 6/2002 | Sutton | 2002/0017336 A1 | 2/2002 | Gass et al. |
| 6,418,829 | B1 | 7/2002 | Pilchowski | 2002/0020261 A1 | 2/2002 | Gass et al. |
| 6,420,814 | B1 | 7/2002 | Bobbio | 2002/0020262 A1 | 2/2002 | Gass et al. |
| 6,427,570 | B1 | 8/2002 | Miller et al. | 2002/0020263 A1 | 2/2002 | Gass et al. |
| 6,430,007 | B1 | 8/2002 | Jabbari | 2002/0020265 A1 | 2/2002 | Gass et al. |
| 6,431,425 | B1 | 8/2002 | Moorman et al. | 2002/0020271 A1 | 2/2002 | Gass et al. |
| 6,450,077 | B1 | 9/2002 | Ceroll et al. | 2002/0043776 A1 | 4/2002 | Chuang |
| 6,453,786 | B1 | 9/2002 | Ceroll et al. | 2002/0050201 A1 | 5/2002 | Lane et al. |
| 6,460,442 | B2 | 10/2002 | Talesky et al. | 2002/0056348 A1 | 5/2002 | Gass et al. |
| 6,471,106 | B1 | 10/2002 | Reining | 2002/0056349 A1 | 5/2002 | Gass et al. |
| 6,479,958 | B1 | 11/2002 | Thompson et al. | 2002/0056350 A1 | 5/2002 | Gass et al. |
| 6,484,614 | B1 | 11/2002 | Huang | 2002/0059853 A1 | 5/2002 | Gass et al. |
| D466,913 | S | 12/2002 | Ceroll et al. | 2002/0059854 A1 | 5/2002 | Gass et al. |
| 6,492,802 | B1 | 12/2002 | Bielski | 2002/0059855 A1 | 5/2002 | Gass et al. |
| D469,354 | S | 1/2003 | Curtsinger | 2002/0066346 A1 | 6/2002 | Gass et al. |
| 6,502,493 | B1 | 1/2003 | Eccardt et al. | 2002/0069734 A1 | 6/2002 | Gass et al. |
| 6,530,303 | B1 | 3/2003 | Parks et al. | 2002/0096030 A1 | 7/2002 | Wang |
| 6,536,536 | B1 | 3/2003 | Gass et al. | 2002/0096591 A1 | 7/2002 | Tanji |
| 6,543,324 | B2 | 4/2003 | Dils | 2002/0109036 A1 | 8/2002 | Denen et al. |
| 6,546,835 | B2 | 4/2003 | Wang | 2002/0170399 A1 | 11/2002 | Gass et al. |
| 6,564,909 | B1 | 5/2003 | Razzano | 2002/0170400 A1 | 11/2002 | Gass |
| 6,575,067 | B2 | 6/2003 | Parks et al. | 2002/0190581 A1 | 12/2002 | Gass et al. |
| 6,578,460 | B2 | 6/2003 | Sartori | 2003/0000359 A1 | 1/2003 | Eccardt et al. |
| 6,578,856 | B2 | 6/2003 | Kahle | 2003/0002942 A1 | 1/2003 | Gass et al. |
| 6,581,655 | B2 | 6/2003 | Huang | 2003/0005588 A1 | 1/2003 | Gass et al. |
| 6,595,096 | B2 | 7/2003 | Ceroll et al. | 2003/0015253 A1 | 1/2003 | Gass et al. |
| D478,917 | S | 8/2003 | Ceroll et al. | 2003/0019341 A1 | 1/2003 | Gass et al. |
| 6,601,493 | B1 | 8/2003 | Crofutt | 2003/0020336 A1 | 1/2003 | Gass et al. |
| 6,607,015 | B1 | 8/2003 | Chen | 2003/0037651 A1 | 2/2003 | Gass et al. |
| D479,538 | S | 9/2003 | Welsh et al. | 2003/0037655 A1 | 2/2003 | Chin-Chin |
| 6,617,720 | B1 | 9/2003 | Egan, III et al. | 2003/0056853 A1 | 3/2003 | Gass et al. |
| 6,619,348 | B2 | 9/2003 | Wang | 2003/0058121 A1 | 3/2003 | Gass et al. |
| 6,640,683 | B2 | 11/2003 | Lee | 2003/0074873 A1 | 4/2003 | Freiberg et al. |
| 6,644,157 | B2 | 11/2003 | Huang | 2003/0089212 A1 | 5/2003 | Parks et al. |
| 6,647,847 | B2 | 11/2003 | Hewitt et al. | 2003/0090224 A1 | 5/2003 | Gass et al. |
| 6,659,233 | B2 | 12/2003 | DeVlieg | 2003/0101857 A1 | 6/2003 | Chuang |
| 6,684,750 | B2 | 2/2004 | Yu | 2003/0109798 A1 | 6/2003 | Kermani |
| 6,722,242 | B2 | 4/2004 | Chuang | 2003/0131703 A1 | 7/2003 | Gass et al. |
| 6,734,581 | B1 | 5/2004 | Griffis | 2003/0140749 A1 | 7/2003 | Gass et al. |
| 6,736,042 | B2 | 5/2004 | Behne et al. | 2004/0011177 A1 | 1/2004 | Huang |
| 6,742,430 | B2 | 6/2004 | Chen | 2004/0040426 A1 | 3/2004 | Gass et al. |
| 6,796,208 | B1 | 9/2004 | Jorgensen | 2004/0060404 A1 | 4/2004 | Metzger, Jr. |
| 6,800,819 | B2 | 10/2004 | Sato et al. | 2004/0104085 A1 | 6/2004 | Lang et al. |
| 6,826,988 | B2 | 12/2004 | Gass et al. | 2004/0159198 A1 | 8/2004 | Peot et al. |
| 6,826,992 | B1 | 12/2004 | Huang | 2004/0194594 A1 | 10/2004 | Dils et al. |
| 6,840,144 | B2 | 1/2005 | Huang | 2004/0200329 A1 | 10/2004 | Sako |
| 6,854,371 | B2 | 2/2005 | Yu | 2004/0226424 A1 | 11/2004 | OBanion et al. |

| | | | |
|---|---|---|---|
| 2004/0226800 | A1 | 11/2004 | Pierga et al. |
| 2004/0255745 | A1 | 12/2004 | Peot et al. |
| 2005/0057206 | A1 | 3/2005 | Uneyama |
| 2005/0092149 | A1 | 5/2005 | Hartmann |
| 2005/0139051 | A1 | 6/2005 | Gass et al. |
| 2005/0139056 | A1 | 6/2005 | Gass et al. |
| 2005/0139057 | A1 | 6/2005 | Gass et al. |
| 2005/0139058 | A1 | 6/2005 | Gass et al. |
| 2005/0139459 | A1 | 6/2005 | Gass et al. |
| 2005/0155473 | A1 | 7/2005 | Gass |
| 2005/0166736 | A1 | 8/2005 | Gass et al. |
| 2005/0178259 | A1 | 8/2005 | Gass et al. |
| 2005/0204885 | A1 | 9/2005 | Gass et al. |
| 2005/0211034 | A1 | 9/2005 | Sasaki et al. |
| 2005/0235793 | A1 | 10/2005 | O'Banion et al. |
| 2005/0274432 | A1 | 12/2005 | Gass et al. |
| 2006/0000337 | A1 | 1/2006 | Gass |
| 2006/0032352 | A1 | 2/2006 | Gass et al. |
| 2006/0123960 | A1 | 6/2006 | Gass et al. |
| 2006/0123964 | A1 | 6/2006 | Gass et al. |
| 2006/0179983 | A1 | 8/2006 | Gass et al. |
| 2006/0219076 | A1 | 10/2006 | Gass et al. |
| 2006/0225551 | A1 | 10/2006 | Gass |
| 2006/0230896 | A1 | 10/2006 | Gass |
| 2006/0247795 | A1 | 11/2006 | Gass et al. |
| 2006/0254401 | A1 | 11/2006 | Gass et al. |
| 2006/0272463 | A1 | 12/2006 | Gass |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4235161 A1 | 5/1993 |
| DE | 4326313 | 2/1995 |
| DE | 19609771 | 6/1998 |
| DE | 20102704 | 2/2001 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 A * | 11/1994 |

OTHER PUBLICATIONS

U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show video.
Analog Devices, Inc., 3-Axis Capacitive Sensor—Preliminary Technical Data AD7103, pp. 1-40, © 1998.
Skil Model 3400-Type 1 10" Table Saw Parts List and Technical Bulletin, S-B Power Tool Company, Jun. 1993.
Shop Fox® Fench Operating Manual, Woodstock International, Inc., 1996, revised May 1997.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
Sink Drain Plug Lifter, circa 1974.
*Descriptions of Safety Systems for Power Equipment*, SawStop, LLC, Aug. 24, 2000.
Tablesaw Splitters and Blade Covers, *Fine Woodworking*, pp. 77-81, Dec. 2001.
Craftsman® Power and Hand Tools, pp. 142-143, 2003.
Young Inventor: Teen's Device Earns Her Trip to Science Fair, *The Arizona Republic*, May 5, 2006.
Grizzly Industrial, Inc. Model G0605X/G0606X Extreme Series 12" Table Saw Owner's Manual, Grizzly Industrial, Inc., Oct. 2006.
Operator Injury Mitigation Using Electronic Sensing and Mechanical Braking and Decoupling Devices in Handheld Circular Saws, Erin F. Eppard, date unknown.

* cited by examiner

SECTION A-A

WOODWORKING MACHINES WITH OVERMOLDED ARBORS

CROSS-REFERENCE TO RELATED APPLICATION

This application claims the benefit of and priority from the following U.S. Provisional Patent Application, the disclosure of which is herein incorporated by reference: Ser. No. 60/496,550, filed Aug. 20, 2003.

FIELD

The present disclosure relates to woodworking machines and more particularly to woodworking machines with overmolded arbors. The disclosure further relates to table saws with safety systems and blade retraction.

BACKGROUND

A table saw is a power tool that includes a work surface or table and a circular blade extending up through the table. A person uses a table saw by moving a work piece past the spinning blade to cut the work piece. When spinning, the circular saw blade presents a risk of injury to a user of the saw. Accordingly, safety features or systems are incorporated with table saws to minimize the risk of injury. Probably the most common safety feature is a guard that physically blocks an operator from making contact with the blade. In many cases, guards effectively reduce the risk of injury, however, there are many instances where the nature of the operations to be performed precludes using a guard that completely blocks access to the blade.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of a machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

DETAILED DESCRIPTION

Figure 1:
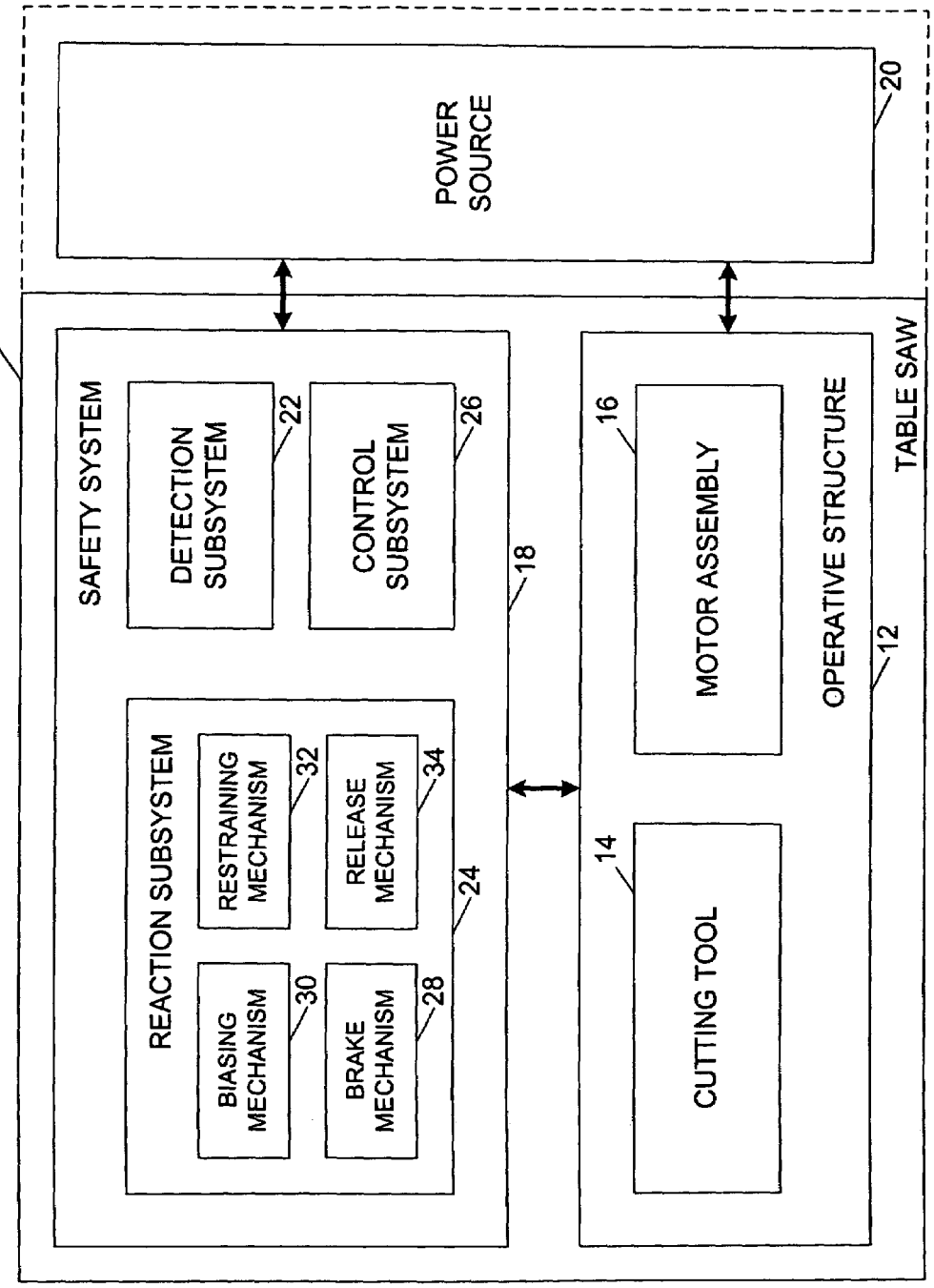
FIG. 1 is a schematic block diagram of a machine with a fast-acting safety system.

A table saw that may incorporate a safety system according to the present invention is shown schematically in FIG. 1 and indicated generally at 10. Saw 10 may be any of a variety of different table saws. Saw 10 includes an operative structure 12 having a cutting tool 14 and a motor assembly 16 adapted to drive the cutting tool. Saw 10 also includes a safety system 18 configured to minimize the potential of a serious injury to a person using the saw. Safety system 18 is adapted to detect the occurrence of one or more dangerous conditions during use of the saw. If such a dangerous condition is detected, safety system 18 is adapted to engage operative structure 12 to limit any injury to the user caused by the dangerous condition.

Saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of saw 10. For example, cutting tool 14 will typically be a single, circular rotating blade having a plurality of teeth disposed along the perimetrical edge of the blade. Alternatively, the cutting tool may be a plurality of circular blades, such as a dado blade or dado stack.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of saw 10. In addition, control subsystem 26 typically includes one or more instruments operable by a user to control the saw. The control subsystem is configured to control saw 10 in response to the inputs it receives.

Detection subsystem 22 is configured to detect one or more dangerous or triggering conditions during use of saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
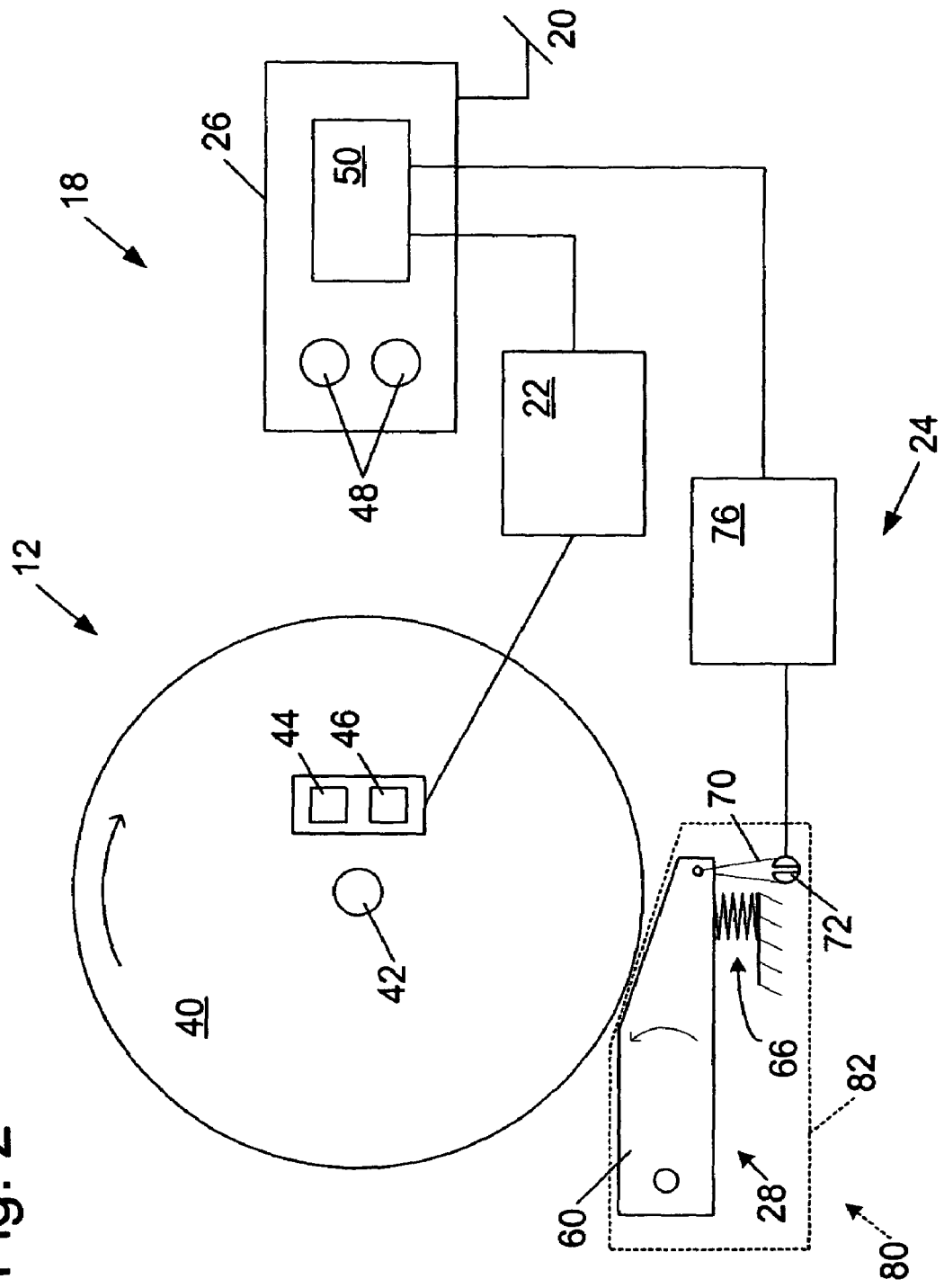
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," and U.S. Provisional Patent Application Ser. No. 60/406,138, entitled "Miter Saw With Improved Safety System," filed Aug. 27, 2002 by SD3, LLC, the disclosures of which are herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," and U.S. Patent Application Publication No. 2003/0058121 A1, entitled "Logic Control With Test Mode for Fast-Acting Safety System," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,568, entitled "Motion Detecting System for use in a Safety System for Power Equipment," filed Aug. 20, 2003 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
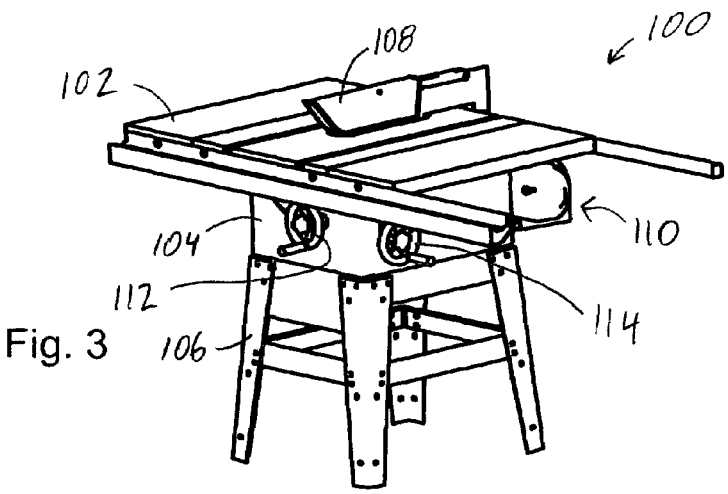
FIG. 3 is a perspective view of a contractor style table saw.

FIG. 3 shows a table saw 100 often called a contractor saw. Saw 100 includes a table 102 on which a work piece may be cut. The table is mounted on a cabinet 104 supported by a stand 106. A blade guard 108 covers the blade. A motor assembly 110 drives the blade. Hand wheels 112 and 114 may be turned to adjust the elevation of the blade (the height the blade extends above the table) and the tilt of the blade relative to the tabletop, respectively. In operation, a user makes a cut by pushing a work piece on the table past the spinning blade.

Figure 4:
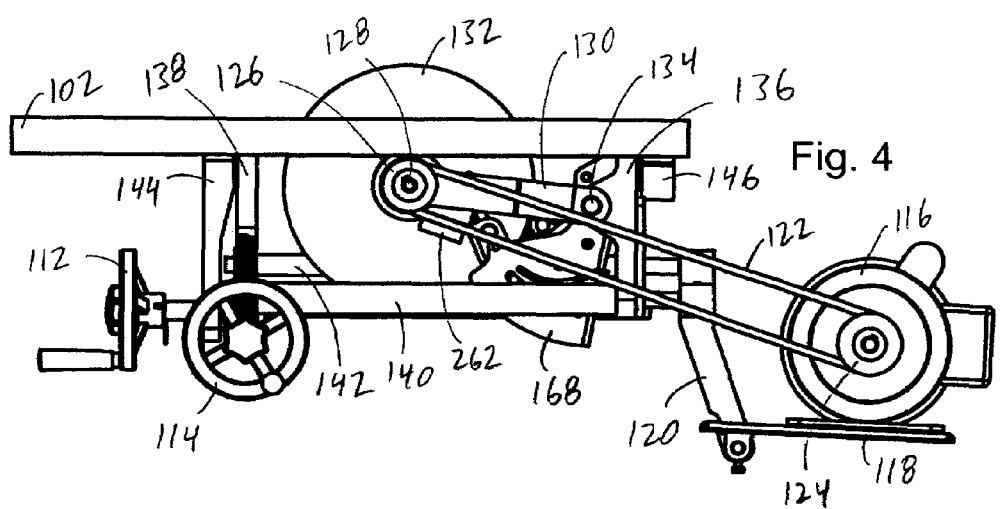
FIG. 4 is a right side elevation view of the table saw shown in FIG. 3 with the stand, cabinet, and several other parts redacted for clarity.
Figure 5:
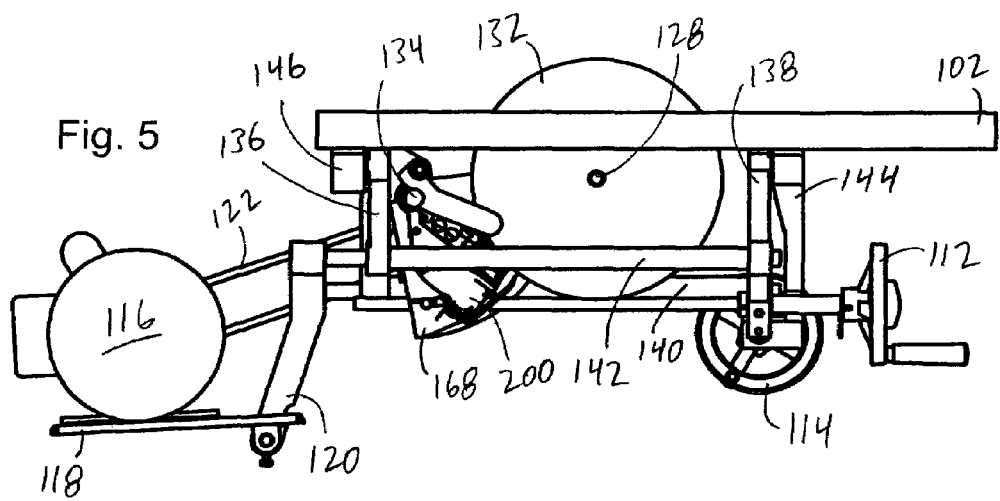
FIG. 5 is a left side elevation view of the saw shown in FIG. 3.
Figure 6:
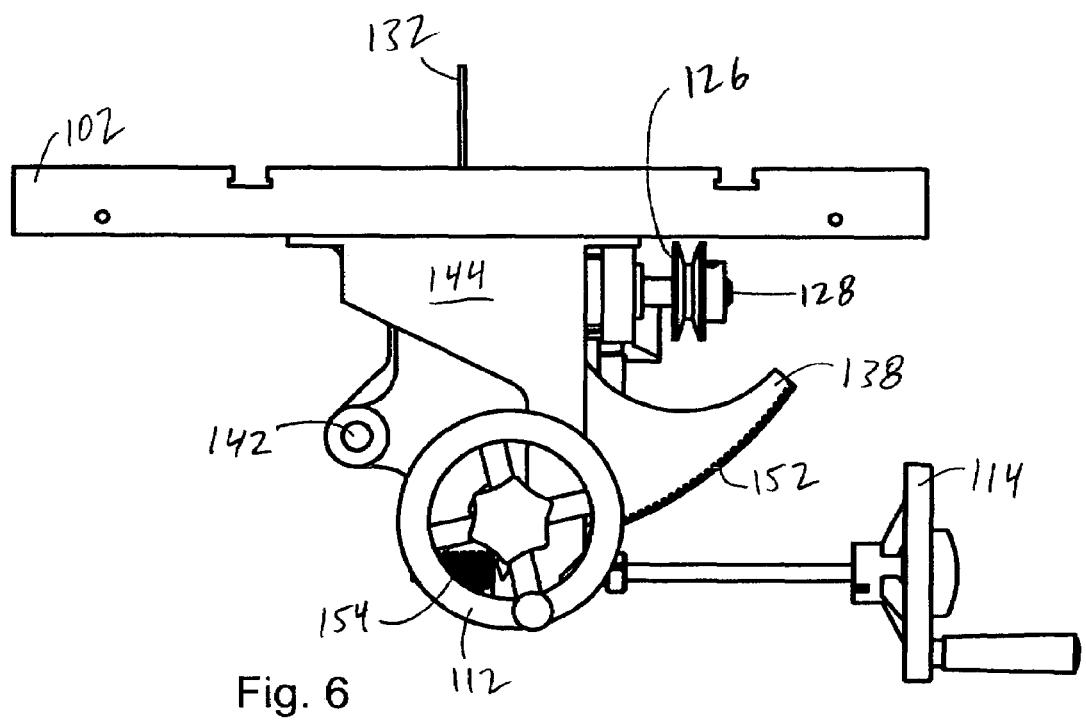
FIG. 6 is a front elevation view of the saw shown in FIG. 3.
Figure 7:
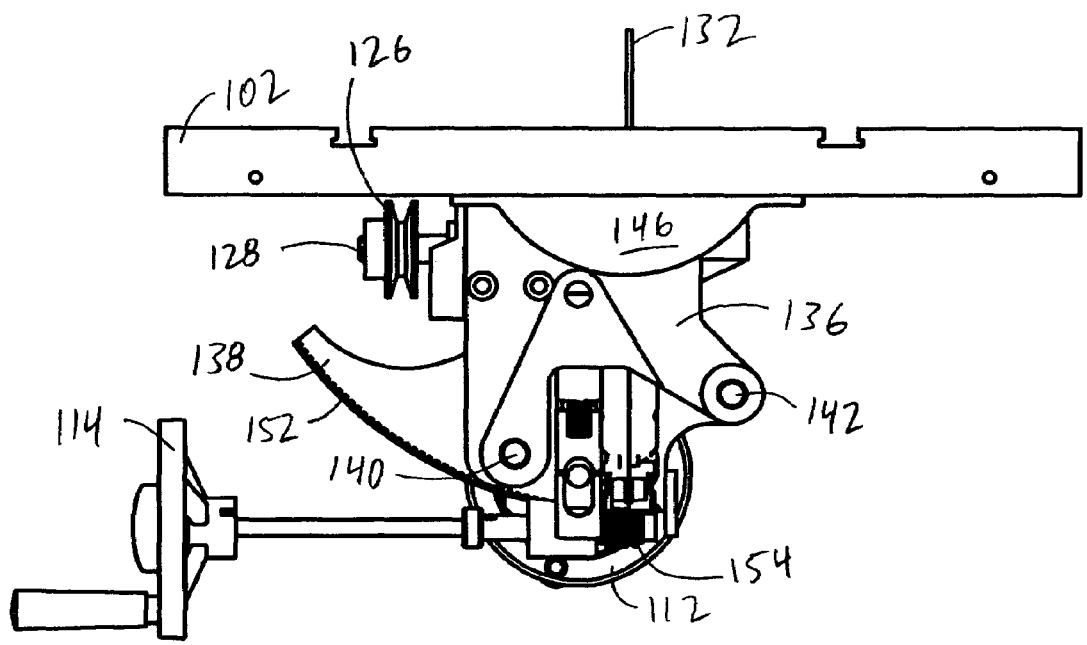
FIG. 7 is a back elevation view of the saw shown in FIG. 3.

FIGS. 4-9 show the internal mechanism of saw 100. A motor 116 is mounted on a bracket 118, which in turn is supported by motor plate 120 attached to the saw. The motor, bracket and motor plate are shown in FIGS. 4 and 5.

A belt 122 extends around a pulley 124 mounted on the drive shaft of the motor and around a pulley 126 mounted on an arbor 128. Arbor 128 is mounted in bearings and supported for rotation by an arbor block 130. A blade 132 is mounted on arbor 128. When motor 116 is running, belt 122 spins arbor 128, thereby spinning blade 132. Blade 132 spins counterclockwise as seen In FIG. 4.

Arbor block 130 is pivotally mounted on pin 134, and pin 134 is supported by rear trunnion 136. The rear trunnion is structurally connected to a front trunnion 138 by a large shaft 140 and a small shaft 142. Motor plate 120 is mounted on the ends of shafts 140 and 142, as shown in FIGS. 4 and 5.

Figure 8:
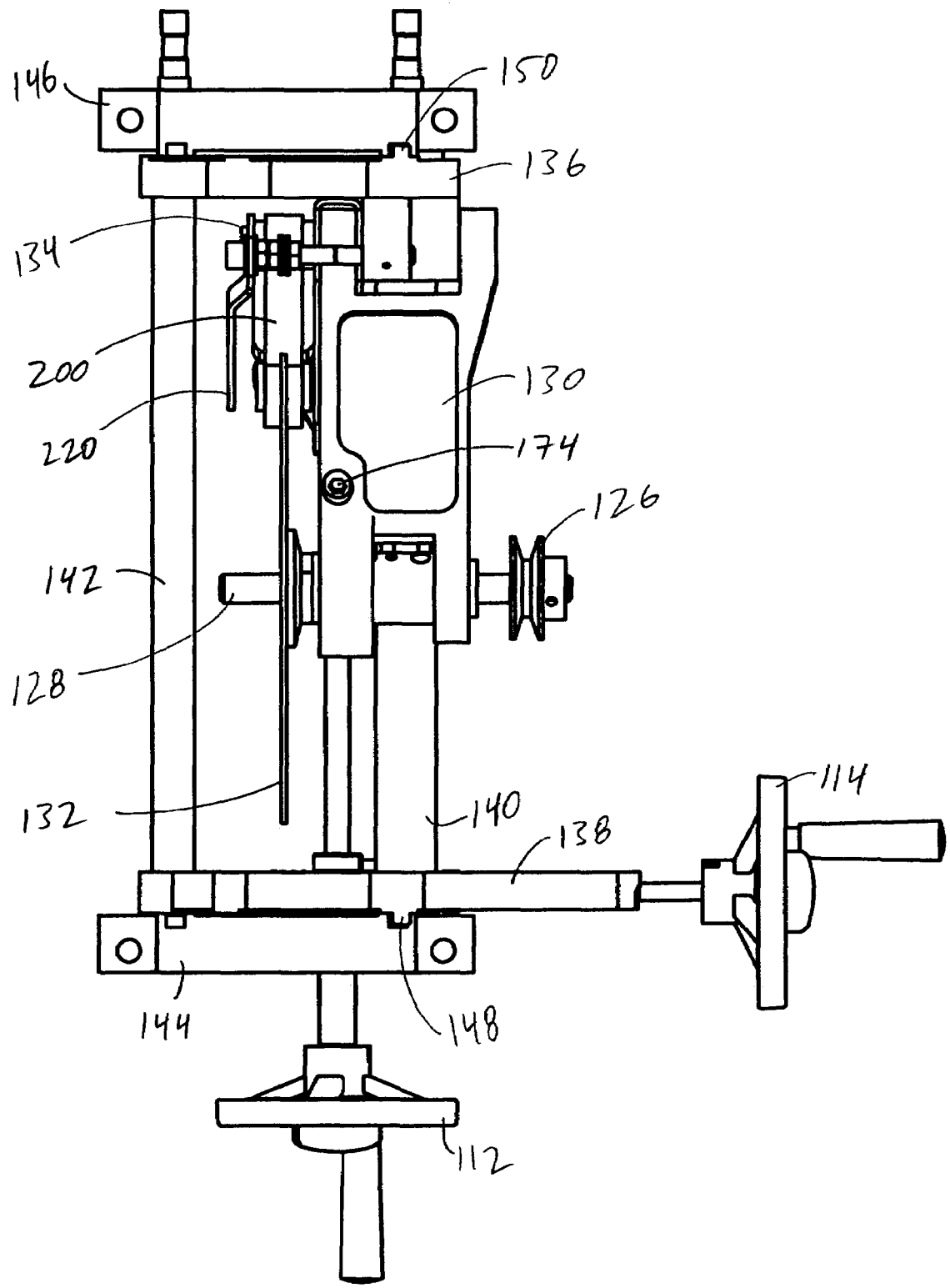
FIG. 8 is a top elevation view of the saw shown in FIG. 3, with the tabletop and other components removed for clarity.
Figure 9:
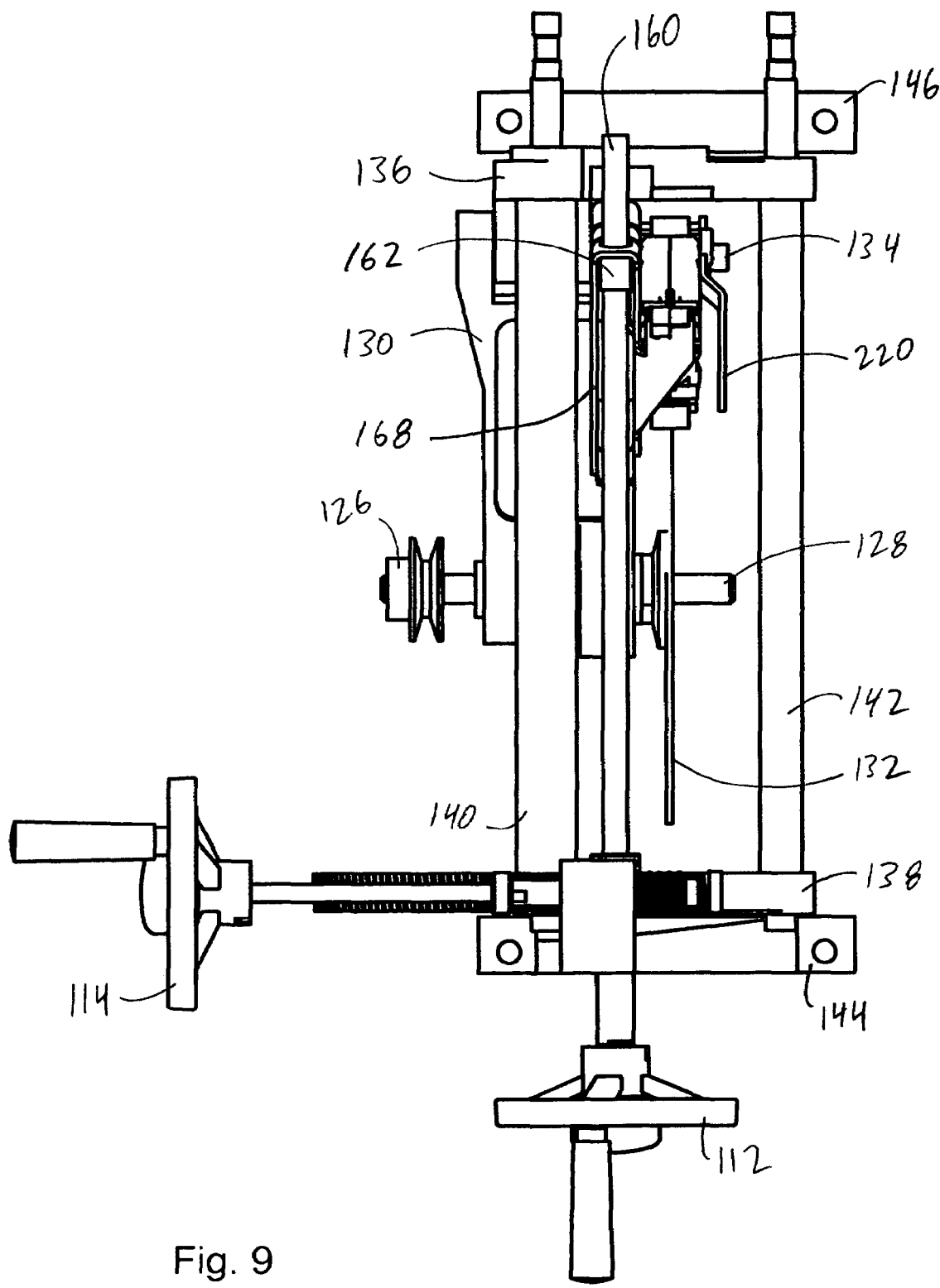
FIG. 9 is a bottom view of the saw shown in FIG. 8.

The front and rear trunnions are supported by front trunnion block 144 and rear trunnion block 146, respectively. Specifically, arcuate flanges on the front and rear trunnions extend into corresponding arcuate grooves on the front and rear trunnion blocks, as shown in FIG. 8 at 148 and 150. The arcuate flanges and grooves allow the front and rear trunnions, the arbor block, and the blade, to tilt relative to the table, as is known in the art. A rack gear 152 on the front trunnion meshes with a worm gear 154 attached to hand wheel 114, so that a user may adjust the tilt of the blade by turning hand wheel 114. The front and rear trunnion blocks, in turn, are bolted to table 102.

Figure 10:
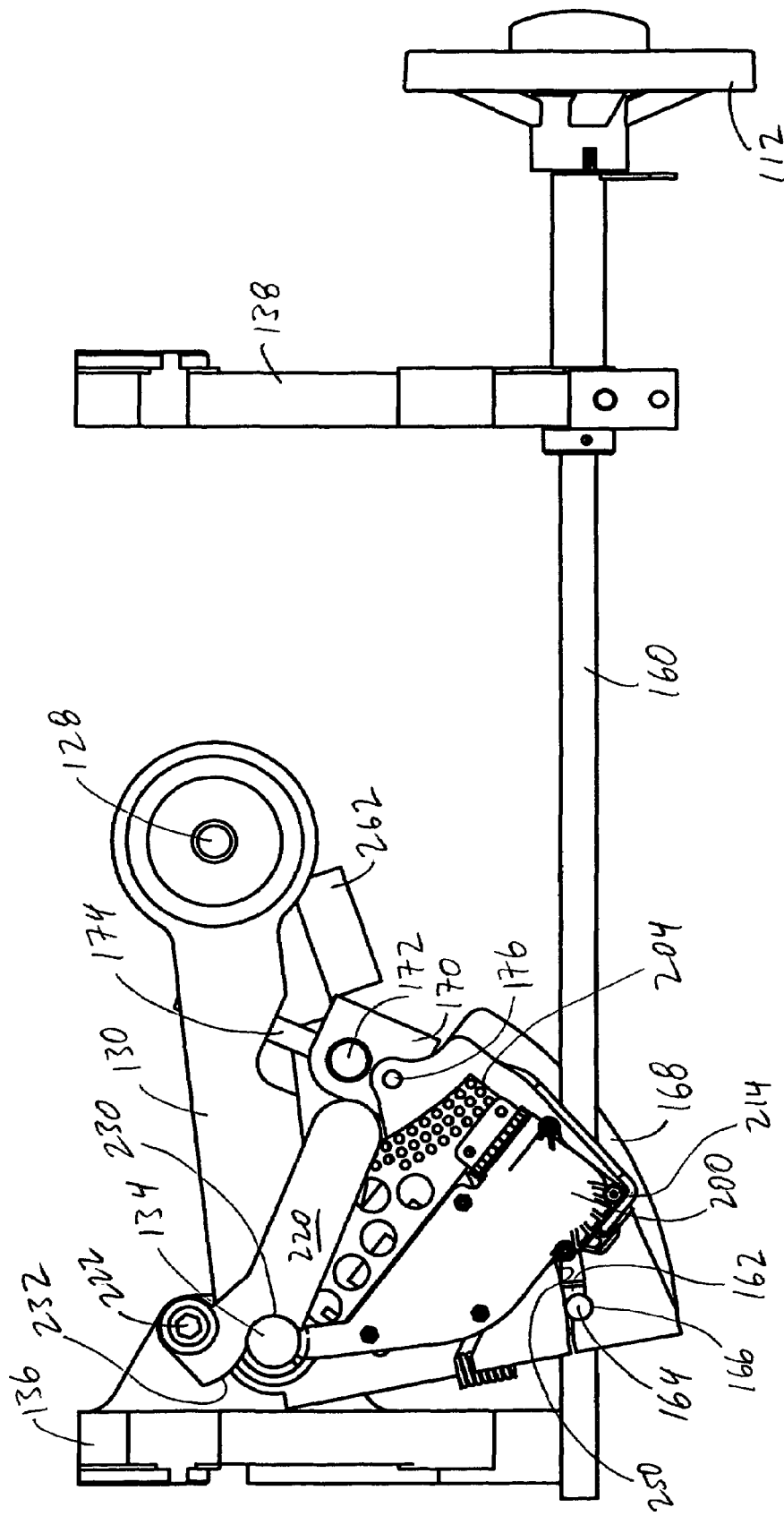
FIG. 10 is a left side elevation view showing components used to adjust the elevation of the blade, and with other components removed for clarity.
Figure 11:
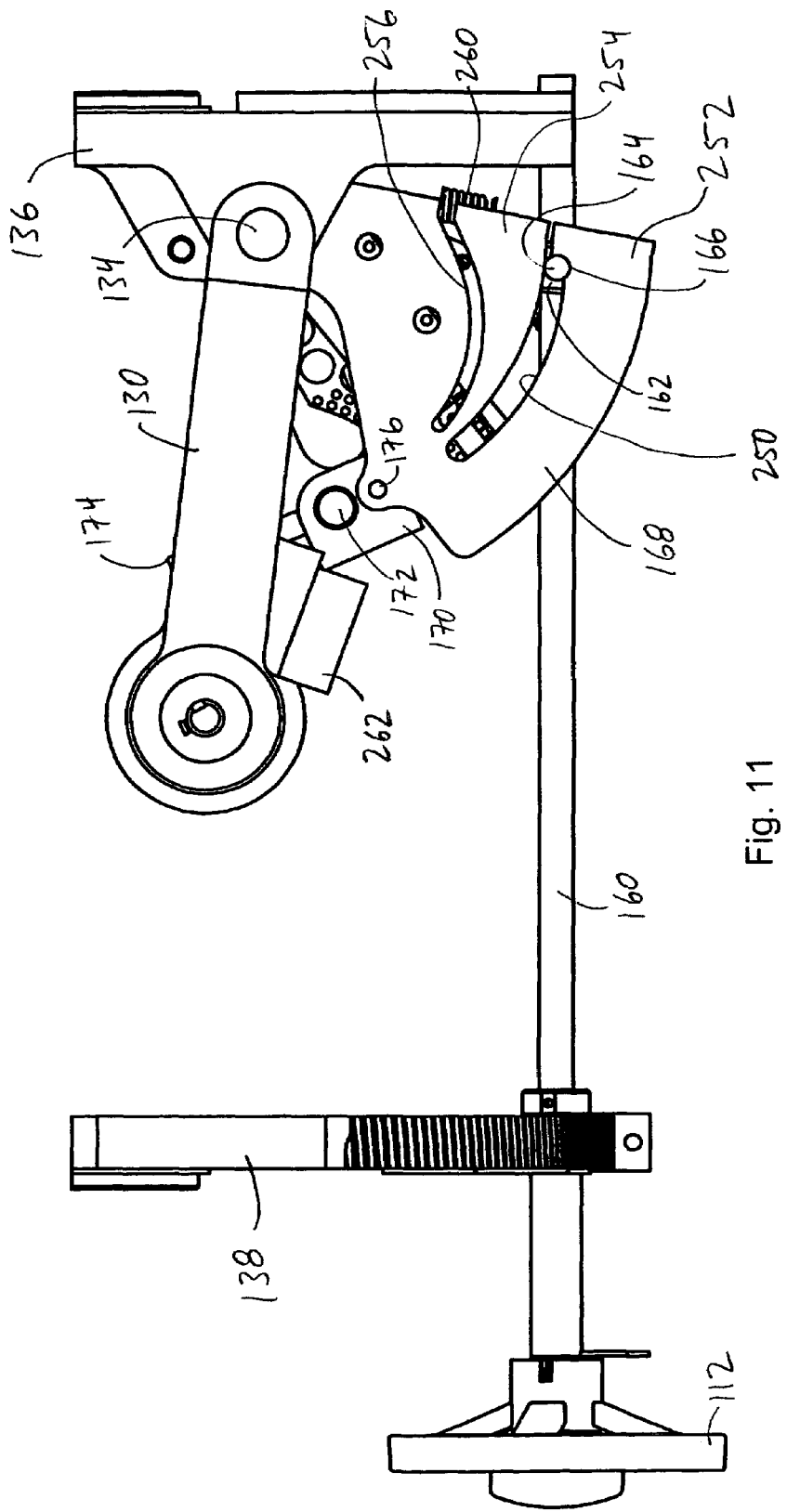
FIG. 11 is a right side elevation view of the components shown in FIG. 10.
Figure 30:
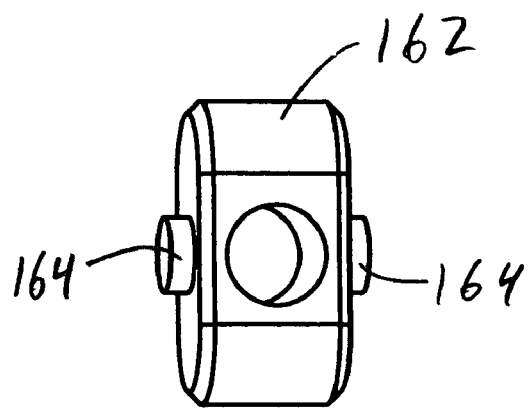
FIG. 30 shows a barrel nut used in the saw shown in FIGS. 4-11.
Figure 31:
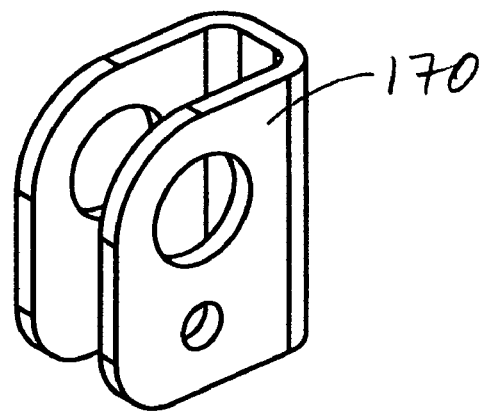
FIG. 31 shows a link used in the saw shown in FIGS. 4-11.
Figure 32:
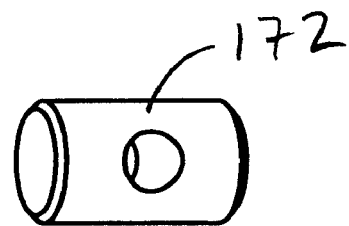
FIG. 32 shows another barrel nut used in the saw shown in FIGS. 4-11.

The mechanism to control the elevation of the blade is shown best in FIGS. 10 and 11. A threaded shaft 160 is supported for rotation by front trunnion 138 and attached to hand wheel 112 so that the shaft rotates when the hand wheel is turned. Shaft 160 is threaded along most of its length, including at the end of the shaft distal from the hand wheel (the threads are not shown in the figures). A first barrel nut 162 is threaded on the distal end of shaft 160. First barrel nut 162 is shown isolated in FIG. 30. The nut includes two shoulders 164, one extending from each side of the nut. Each shoulder is held in a notch 166 in a bracket 168, as shown in FIGS. 10 and 11, one notch on each side of the bracket. The bracket is a "U" shaped piece that is pivotally mounted on pin 134 and supported by rear trunnion 136. The bracket is shown separate from the rear trunnion in FIGS. 12 through 15. Apertures 137 in the bracket are shown in those figures, and pin 134 extends through those apertures to mount the bracket to the rear trunnion.

Figure 12:
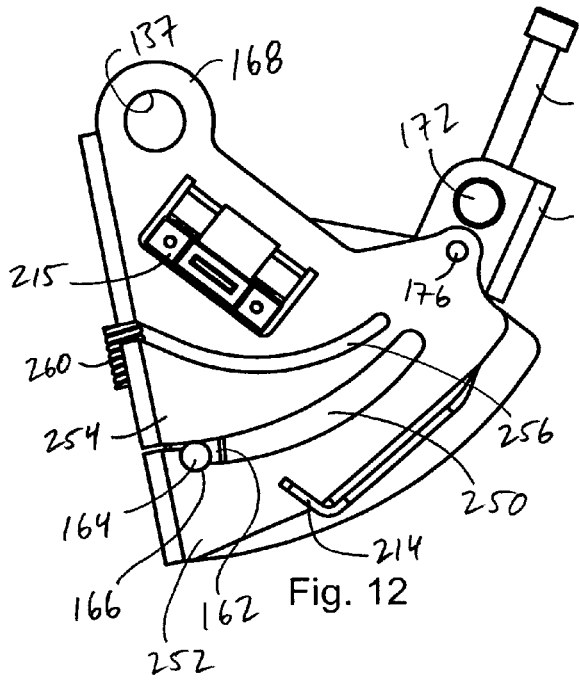
FIG. 12 is a side elevation view of a cartridge bracket and other components used to adjust the elevation of the blade.
Figure 13:
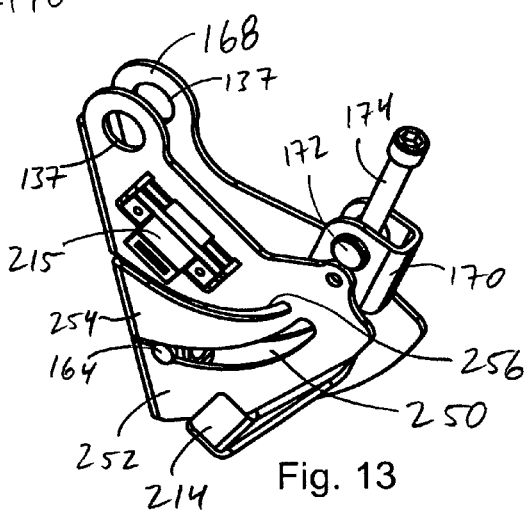
FIG. 13 is a perspective view of the cartridge bracket and other components shown in FIG. 12.
Figure 14:
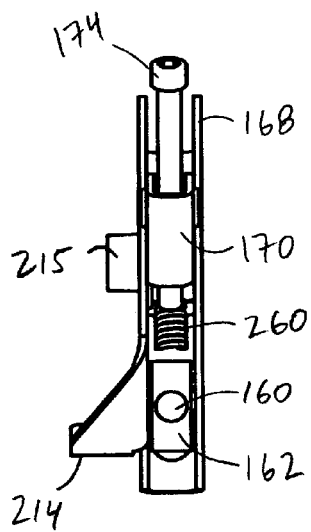
FIG. 14 is a front elevation view of the cartridge bracket and other components shown in FIG. 12.
Figure 15:
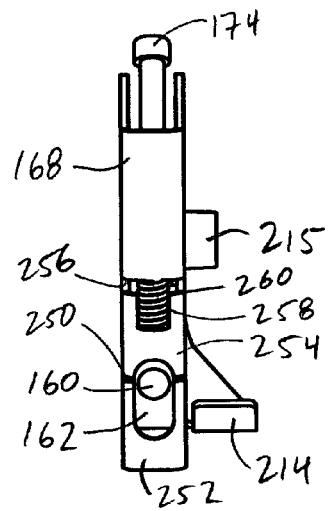
FIG. 15 is a back elevation view of the cartridge bracket and other components shown in FIG. 12.

Bracket 168 is connected to arbor block 130 by a link 170, a second barrel nut 172, and a bolt 174 extending through the arbor block. These components are also shown in FIGS. 12 through 15, 31 and 32. Link 170 is a "U" shaped piece that is pivotally connected to the bracket by rivets 176, as shown in FIG. 12. Of course, the link can be connected to the bracket by other means as well. Barrel nut 172 has two ends, and each end of the nut extends into and is captured by apertures in the sides of the link. In that manner, the barrel nut may pivot around an axis extending between its ends, but it cannot move toward or away from the bracket. Bolt 174 passes through an aperture in the arbor block and is held in place by the head of the bolt on the top of the arbor block, and by a wave washer and a snap ring or clip that fits into a groove cut into the bolt under the arbor block. Bolt 174 is then threaded into barrel nut 172.

When a user turns hand wheel 112 and shaft 160, first barrel nut 162 moves along the shaft. In the embodiment shown in FIGS. 4 through 11, when a person standing in front of the saw turns the hand wheel clockwise, the first barrel nut will travel up the shaft toward the user. Bracket 168 will then pivot up because the first barrel nut is held in notches 166 in the bracket. Bracket 168 will push link 170 and bolt 174 up, thereby causing the arbor block and blade to rise. Similarly, turning hand wheel 112 counterclockwise will cause the arbor block and blade to retract. Shaft 160 may flex as barrel nut 162 moves along the shaft.

Figure 16:
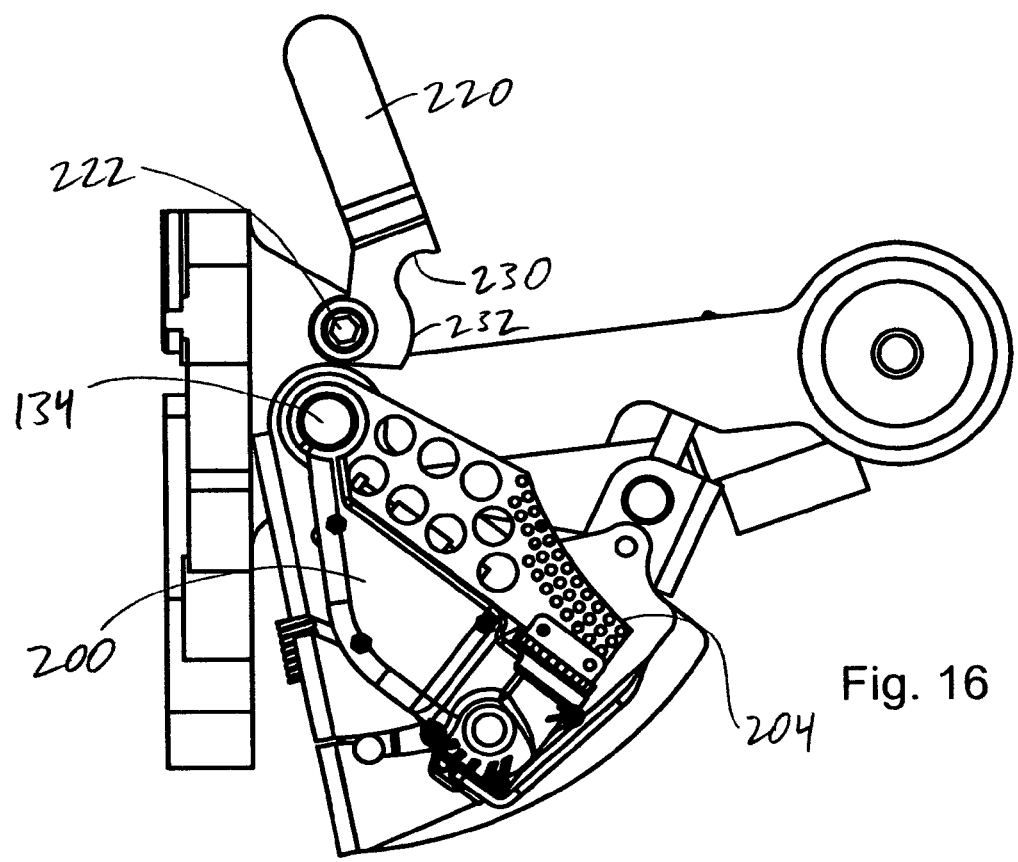
FIG. 16 is a side elevation view of a brake cartridge and cartridge bracket, with a retaining handle raised.
Figure 17:
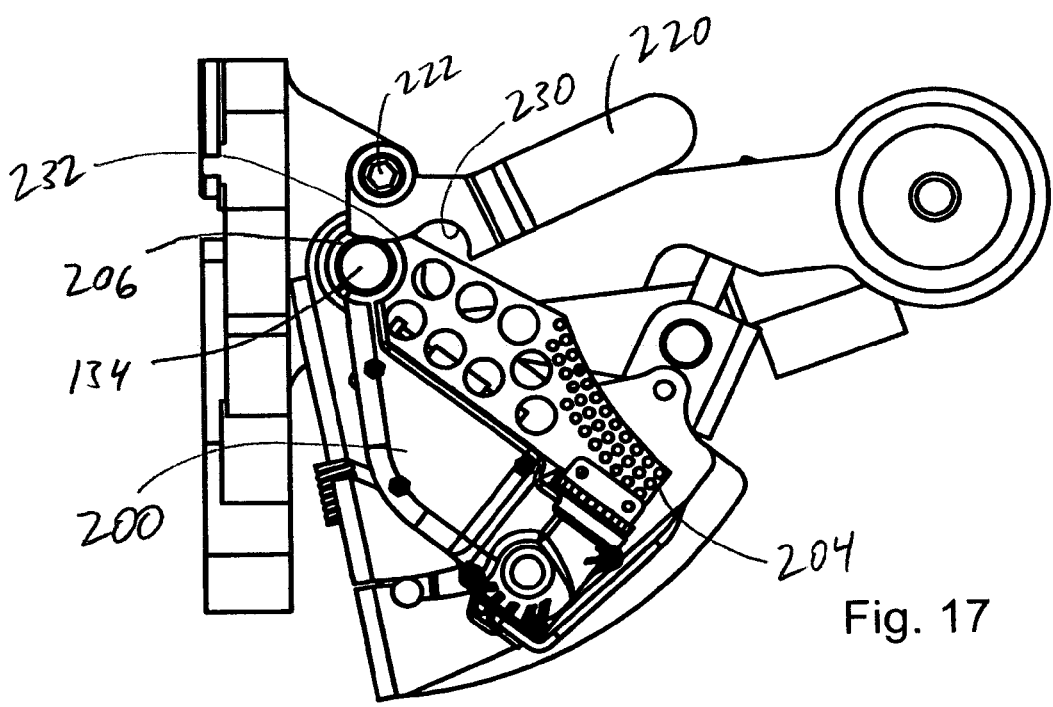
FIG. 17 is similar to FIG. 16, except the retaining handle is in a different position.
Figure 18:
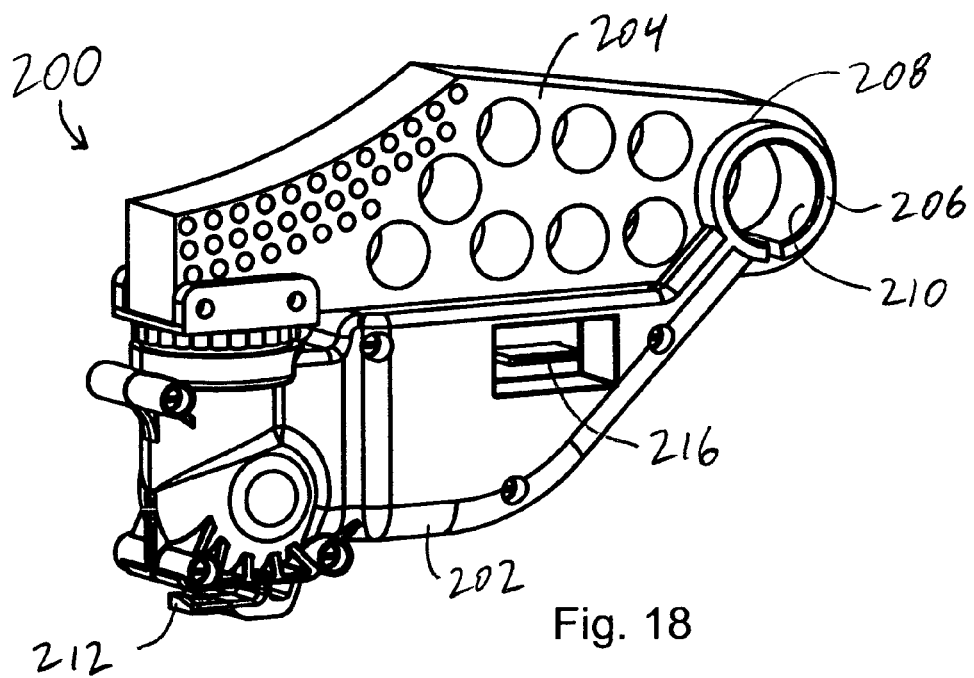
FIG. 18 is a perspective view of a possible brake cartridge.

The saw shown in FIGS. 3 through 15 includes a brake cartridge 200. The brake cartridge is best seen in FIGS. 10 and 16-18. Brake cartridge 200 is a type of reaction mechanism 24, as discussed above. The brake cartridge includes a shell 202 that encloses a biasing mechanism 30, restraining mechanism 32, and release mechanism 34, as discussed above. The brake cartridge also includes a brake pawl 204 made of fully annealed aluminum. End 206 of the housing extends through an aperture 208 in the brake pawl to join the housing and pawl, as shown in FIG. 18. Cartridges such as cartridge 200 are described in more detail in U.S. Provisional Patent Application No. 60/496,574, entitled "Brake Cartridges for Power Equipment," filed Aug. 20, 2003 by SD3, LLC, which is hereby incorporated by reference.

End 206 of the housing includes an aperture 210, and the brake cartridge is mounted in the saw by sliding the cartridge onto pin 134 through aperture 210. Brake cartridge 200 also includes a flange 212 on the end of the cartridge opposite end 206. Flange 212 is configured to accept a tab 214 on bracket 168, as shown in FIGS. 10, 16 and 17. (Tab 214 is shown best in FIGS. 12-15.) In this manner, brake cartridge 200 is securely held by bracket 168 so that the brake cartridge does not pivot relative to bracket 168.

The brake cartridge is designed so that it automatically connects with the power source, switches, electrodes, and possibly other electronics when the cartridge is slid on pin 134 and positioned by tab 214. A plug 215 is mounted on bracket 168, and a corresponding plug 216 is part of the brake cartridge. In the embodiment shown in FIGS. 12 through 15 and 18, plug 215 is a printed circuit board card edge connector, and plug 216 is a printed circuit board card edge designed to fit into plug 215. When a user slides the cartridge on pin 134 and aligns the cartridge with tab 214, plugs 215 and 216 will be aligned and will connect when the cartridge is slid all the way on the pin. This facilitates the installation and replacement of brake cartridges by the user, and insures that the cartridge is electrically connected to the rest of the system. The user would not have to make any other electrical connections to install the cartridge. Of course, many different types of plugs may be used. For example, a standard, high-density, 15-pin D-Sub plug may be used instead of a card edge connector. In that case, the male portion of the D-Sub plug may be mounted on the cartridge, and the female portion mounted on the saw so that if a pin on the plug were bent, simply replacing the cartridge would repair the plug. This configuration, while perhaps presenting several advantages, is not required; it is simply one of many arrangements that may be used. A user may install brake cartridge 168 in a saw by simply reaching through the throat plate opening in the table while holding the cartridge and then sliding the cartridge onto pin 134 and tab 214. The throat plate opening in the table is the opening through which the blade extends.

A handle 220 is pivotally mounted on a bolt 222 supported by rear trunnion 136. Handle 220 pivots down to lock brake cartridge 168 onto pin 134, and pivots up so that the brake cartridge may be removed and replaced. The handle is shown down in FIG. 10, locking brake cartridge 168 in place. The handle is shown up in FIG. 16, and is shown at an intermediate position in FIG. 17. A user moves handle 220 by reaching down through the throat plate opening in the table and pivoting the handle up or down.

Handle 220 includes a first surface 230 shaped to correspond to the outer surface of pin 134. When the handle is fully down, surface 230 extends around the pin, as shown in FIG. 10. The handle also includes a second surface 232 shaped to rub against pin 134 as the handle pivots. The friction that results from the surface 232 rubbing against the pin helps hold the handle in place and provides a positive feel to the user. Surfaces 230 and 232 are shaped so that the handle snaps or locks into place around pin 134 when the handle is pivoted down.

Handle 220 helps insure that the brake cartridge is correctly positioned in the saw and plugged into plug 215. If brake cartridge 200 is not fully slid onto pin 134, then handle 220 cannot pivot down because second surface 230 would contact either the brake pawl or end 206 of the brake cartridge. Thus, a user cannot pivot handle 220 down until the brake cartridge is slid all the way on pin 134. Handle 220 also prevents the brake cartridge from being removed until the handle is fully up. FIG. 17 shows handle 220 approximately half way between being fully down and fully up. In that position, second surface 230 is rubbing against pin 134 and is in front of end 206 of the brake cartridge, blocking the brake cartridge from being slid off pin 134. Brake cartridge 200 can only be removed when handle 220 is all the way up, as shown in FIG. 16. This helps prevent the cartridge from sliding off pin 134 and becoming unplugged. Also, handle 220 is configured so that it is long enough to extend up through the throat plate opening in the table so that a user would see the handle and could not install a throat plate until the handle is pivoted down. This feature helps to prevent a user from forgetting to pivot the handle down to lock the brake cartridge into place.

Brake cartridge 200 is positioned so that it is closely adjacent the perimeter of blade 132, as shown in FIG. 5. When the detection subsystem detects a dangerous condition, such as a person contacting the spinning blade, the control system will trigger the brake cartridge and the brake cartridge will quickly pivot brake pawl 204 out, into the teeth of the blade. The teeth will cut into the brake pawl and bind, thereby stopping the blade from spinning. The closer the brake pawl is to the perimeter of the blade, the faster the blade will stop because the brake pawl will have less distance to travel before it contacts the teeth.

In the embodiment shown in FIGS. 4 through 15, the elevation control mechanism, discussed above, is constructed so that the position of the brake pawl relative to the perimeter of the blade may be adjusted. This position may be referred to as blade-to-pawl spacing. As discussed above, the elevation control mechanism includes link 170, second barrel nut 172 and bolt 174, as shown in FIGS. 10 through 15 and 30 through 32. Those components help determine the position of bracket 168 and brake cartridge 200 relative to the blade. When bolt 174 is turned, barrel nut 172 will travel up or down the length of the bolt. The barrel nut is captured by link 170, so as the barrel nut moves up and down the bolt, link 170 also moves. Link 170, in turn, is connected to bracket 168, as explained. Thus, when bolt 174 is turned, bracket 168 and brake cartridge 200 will pivot toward or away from the blade. In this manner, a person may infinitely adjust the blade-to-pawl spacing. The adjustment can be made by extending, for example, an Allen wrench through the throat plate opening in the table to engage and turn the head of bolt 174. The ability to adjust blade-to-pawl spacing is an optional feature. Alternatively, the position of the brake cartridge relative to the blade may be fixed for specific blades, or the position may be adjustable between specific fixed or indexed positions only. Also, different brake cartridges may be used for different blades, such as dado blades, and those cartridges may be designed so that the brake pawl is close to the perimeter of the specific blade for which it was designed.

The design of the elevation control mechanism, bracket 168, brake cartridge 200, and rear trunnion 136 insure that brake cartridge 200 moves with the blade and is always adjacent the perimeter of the blade. Because the brake cartridge is mounted on the bracket, and because the bracket and arbor block are both pivotally mounted on the same pin, when the arbor block pivots up or down to change the elevation of the blade relative to the tabletop, the brake cartridge will also pivot up and down with the blade and maintain the same blade-to-pawl spacing. Similarly, when the front and rear trunnions slide relative to the front and rear trunnion blocks to change the tilt of the blade, the brake cartridge will move with the blade because the bracket and brake cartridge are supported by the rear trunnion. Thus, the brake cartridge maintains its position relative to the blade and is ready to stop the blade in case of an accident.

The saw embodiment shown in FIGS. 4 through 11 is also designed to retract the blade beneath the tabletop when the brake cartridge stops the blade. Retracting the blade helps minimize the time the cutting tool is in contact with the user, thereby minimizing any injury to the user. Moving the cutting tool away from the point of accidental contact also prevents the cutting tool from moving toward the user, which could increase any injury to the user. For example, the spinning blade in a table saw has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Blade 132 spins clockwise when looking at the saw as shown in FIG. 5, and when it is spinning, the blade will have angular momentum. When brake cartridge 200 engages and stops the blade, the angular momentum of the blade will be transferred to the arbor block, brake cartridge and bracket, and those components will try to spin in the same direction as the blade due to the conservation of angular momentum. The arbor block, bracket and brake cartridge will then all try to move down, or pivot clockwise around pin 134, because that is the only movement they can make that is in the same direction as the blade was spinning. The elevation control mechanism, and particularly bracket 168 and first barrel nut 162, are designed to use the angular momentum of the blade to retract the blade in case of an accident.

As discussed above, and as shown in FIGS. 10 through 15 and 30, first barrel nut 162 includes shoulders 164 that are held in notches 166 in bracket 168. Notches 166 are part of a slot 250 that extends through bracket 168 from one side of the bracket to the other. Shoulders 164 on barrel nut 162 are circular, and notches 166 are shaped to conform to and extend around a bottom portion of those shoulders, as shown. The top surface of slot 250 contacts the top of shoulders 164, so that the shoulders are pinched between the top surface of slot 250 and notches 166. Because slot 250 extends from one side of the bracket to the other, and because the bracket is typically constructed of folded or stamped sheet metal, the slot creates a spring arm 252 in the bracket. Slot 250 is sized so that shoulders 164 push spring arm 252 down or out when the shoulders are seated in notches 166. In this manner, spring arm 252 applies a force against shoulders 164 to help hold barrel nut 162 in place.

Bracket 168 also includes a second spring arm 254 having an upper edge defined by a second slot 256, and having a lower edge defined by slot 250. Second slot 256, like slot 250, extends from one side of the bracket to the other. Second spring arm 254 comprises the material extending between slots 250 and 256. Slot 256 is sized and positioned relative to slot 250 so that there is less material between the ends of the two slots on each side of the bracket than at other points so that the second spring arm can flex without deforming.

As explained above, bracket 168 is "U" shaped, with two sides and a web or spine connecting the two sides. Slot 256 is configured so that it creates a socket 258 in the web of the bracket. A coil spring 260 is held in the socket by tabs that extend from both the bottom and top of the slot into the coil of the spring. The spring is sized so that it pushes down on spring arm 254 to apply pressure to shoulders 166 on barrel nut 162. The pressure applied by spring 260 and second spring arm 254 further helps hold barrel nut 162 in place. The bracket shown in 10 through 15 is simply one embodiment of many possible brackets. Brackets may be designed with varying slots and with or without springs like spring 260.

When brake cartridge 200 stops the blade, the angular momentum creates a significant force tending to urge the blade down, away from the tabletop, and that force is sufficient to overcome the force holding barrel nut 162 in notches 166. Thus, when brake cartridge 200 engages the blade, the angular momentum of the blade causes bracket 168 to pivot down, and barrel nut 162 snaps out of notches 166. When barrel nut 162 snaps free of notches 166, bracket 168 is then free to pivot down with shoulders 164 sliding in slot 250. Slot 250 is configured so that it extends in front of notches 166 on each side of bracket 168, and the slot increases in size so that shoulders 164 can slide freely in the slot. Slot 250 is also arcuate so that the bracket can pivot down without binding on the barrel nut. In this manner, the blade and arbor block become disconnected from the elevation control mechanism, so the blade retracts beneath the table. The angular momentum of the blade is so significant that the retraction of the blade happens very quickly, typically in only a few milliseconds.

Using a structure as described above, a force of 5 to 200 pounds or more can be exerted on the barrel nut to hold it in place. The force can be adjusted by changing the geometry of spring arms 252 and 254, and/or by changing spring 260, if a spring is used. The force both eliminates play in the mechanism when the barrel nut is seated in notches 166, and defines how much force is required to snap the barrel nut free to retract the blade.

A bumper 262, as shown in FIGS. 4, 10 and 11, is mounted to the bottom of arbor block 130 above shaft 140. The bumper may be made from urethane, rubber, or some other cushioning material. Upon retraction of the blade, the bumper will impact shaft 140 and thereby limit the downward movement of the blade and arbor block. Shaft 140 should be sized sufficiently to withstand the force of the impact from the bumper, and that is why shaft 140 is shown larger than shaft 142. Alternatively, the bumper may be mounted on the shaft, in which case the arbor block would pivot down into contact with the bumper.

The impact on the arbor block from retracting the blade has the potential to damage the saw. To help address this concern, the arbor block may be made from a ductile iron, such as FC25, that is better able to withstand the impact. Also, the main bearing supporting the arbor may be bigger than it otherwise would be.

After the blade and arbor block have retracted, the elevation control mechanism can be reset simply by reaching through the throat plate opening in the table and pulling up on the arbor block until barrel nut 162 snaps into notches 166, or hand wheel 112 may be turned to cause barrel nut 162 to travel back in slot 250 until the barrel nut snaps into place. As shown, slot 250 extends behind and between notches 166, and the slot extending between the notches is small so that shoulders 164 cannot move back past notches 166. Once barrel nut 162 snaps into place in notches 166, the elevation control mechanism is again functional and a user may turn hand wheel 112 to raise and lower the blade.

When the brake cartridge fires, the blade cuts into the brake pawl and binds. The spent cartridge will then have to be replaced with a new one to make the saw functional. To replace the spent cartridge the blade must first be knocked off the brake pawl. However, there may still be residual pressure from the spring in brake cartridge pushing the brake pawl onto the blade. That residual pressure should be released prior to knocking the pawl off the blade. Any residual pressure can be released by turning bolt 174 to move the cartridge away from the blade. The brake pawl will be held on the blade as the cartridge moves away, thereby allowing the spring to fully expand. The brake cartridge can then be knocked off the blade and the spent cartridge replaced with a new one.

Figure 19:
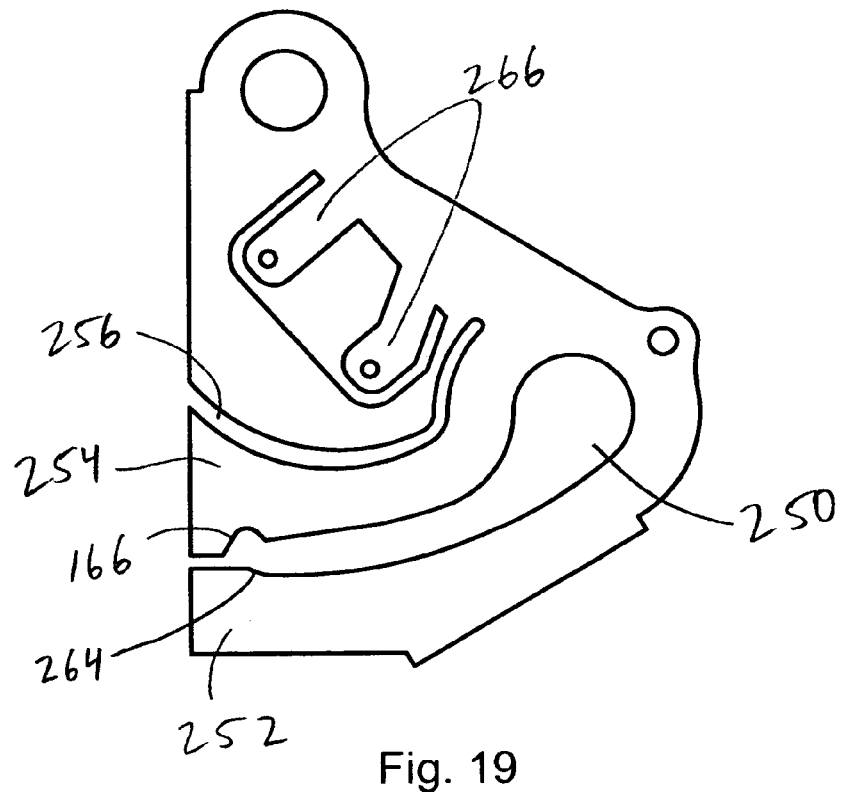
FIG. 19 shows geometry for an alternative bracket.

An alternative bracket is shown in FIG. 19. Slot 250 in the bracket shown in FIG. 19 is configured so that first spring arm 252 has sufficient spring force to hold the barrel nut in notches 166 without the use of a coil spring such as spring 160 shown in FIGS. 12-15. In this configuration, slot 250 includes a larger opening on each side of the bracket at the end of the slot with less material surrounding the slot. Additionally, notches 166 in the alternative bracket are configured so that they surround the top portion of the shoulders of the barrel nut. Encircling the top portion of the shoulders helps hold the barrel nut in position because as the elevation of the blade is raised and the bracket pivots up, the shoulders tend to roll into the notches. In contrast, positioning notches 166 on the bottom of the shoulders causes the weight of the arbor block and blade to tend to roll the shoulders out of the notches when the blade is raised. Notches 166 in FIG. 19 are also non-circular and are shaped so that they provide point contact with the shoulders of the barrel nut. The point contact provides a positive seating of the shoulders in the notches. A drop-off 264 is also included in slot 250 on each side of the bracket below notches 166. The drop-off is designed to help release the barrel nut as quickly as possible after a sufficient force is experienced to snap the barrel nut out of the notches. The drop-off provides almost immediate clearance for the barrel nut to slide relative to the slot. FIG. 19 also shows two tabs 266 to which a plug may be mounted to connect a cartridge to other electric components and switches in the saw.

Figure 20:
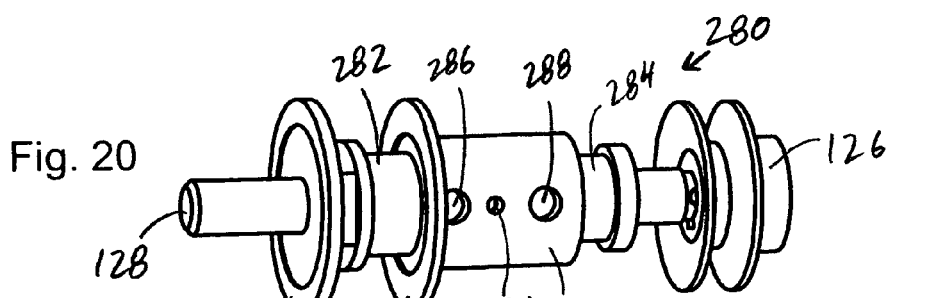
FIG. 20 shows a possible arbor assembly.
Figure 21:
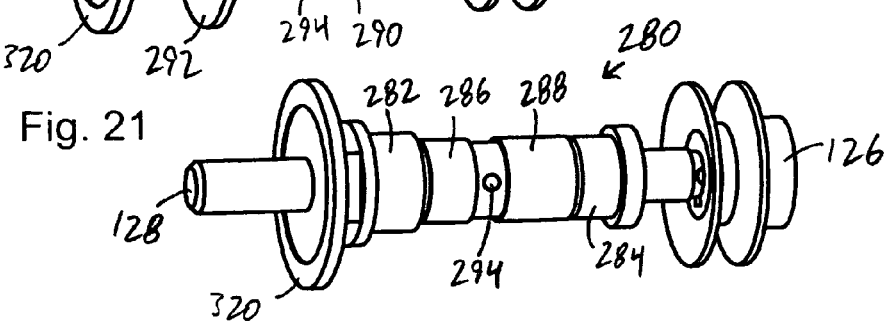
FIG. 21 shows the arbor assembly of FIG. 20 with an electrode sheath removed.

FIGS. 20 and 21 show an arbor assembly 280 that may be used in detection subsystem 22. The arbor assembly includes an arbor 128, a first insulating bushing 282, and a second insulating bushing 284. The bushings are made of a hard, nonconductive material such as a thermoset, a bulk molding compound, or a thermoplastic. One possible material is 30% glass filled ULTEM. The bushings electrically isolate the arbor and blade from the rest of the saw. Because the arbor and blade are electrically isolated, it is possible that a static electric charge may build up on the arbor as it spins. Any such static electric charge may affect the detection subsystem in the saw. In that case, the bushings alternatively may be made of a slightly conductive or static dissipative material to dissipate any static electricity that may build up over time.

Bushings 282 and 284 are mounted directly on arbor 128, and the bushings provide seats for the bearings to support the arbor in the arbor block. Each bushing also includes a raised flange to prevent the side of a bearing from contacting and potentially grounding the arbor. First and second electrodes 286 and 288, respectively, are positioned between the bushings and concentrically around the arbor but not touching the arbor. The electrodes are made of a conductive material such as bronze, and they are part of the capacitive coupling that imparts the electrical signal to the arbor and blade and then monitors that signal, as discussed above and as discussed in several of the references incorporated by reference. The electrodes are electrically connected to the control subsystem of the saw in any known manner. The electrodes are press fit into and held by an electrode shell 290, shown in FIG. 20. The electrode shell is not shown in FIG. 21 so that the electrodes may be seen more clearly. The electrode shell, in turn, is held in the arbor block around the arbor. In the arbor assembly shown in FIG. 20, electrode shell 290 includes a flange 292 that is positioned inside the bearing bore in the arbor block between the bearing and the arbor block. The other end of the electrode shell is positioned in a bore in the arbor block adjacent the small arbor bearing. Of course, the electrode shell may be held in the arbor block in any known way. In this assembly, the arbor is electrically isolated from the rest of the saw, and the electrodes provide an effective capacitive coupling to the blade.

FIGS. 20 and 21 also show a hole 294 in the arbor and electrode shell that may be used to detect blade rotation. Specifically, a light emitting diode and sensor may be positioned so that as the blade rotates, light shines through hole 294. Detecting blade rotation may be used to enable the detection subsystem only when the blade is spinning, as described in U.S. Patent Application Publication No. 2002/0017178 A1, entitled "Motion Detecting System for Use in a Safety System for Power Equipment," which was mentioned above and is hereby incorporated by reference.

Figure 22:
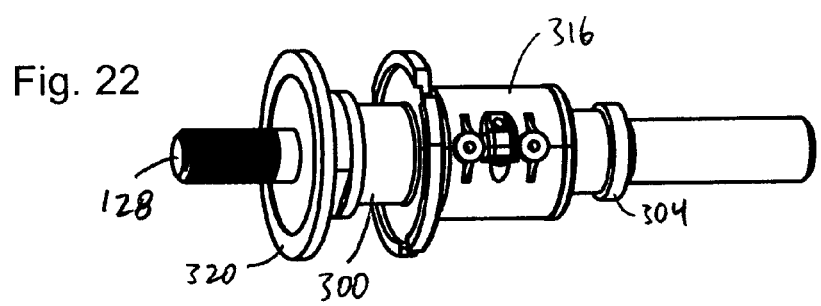
FIG. 22 shows another possible arbor assembly.
Figure 23:
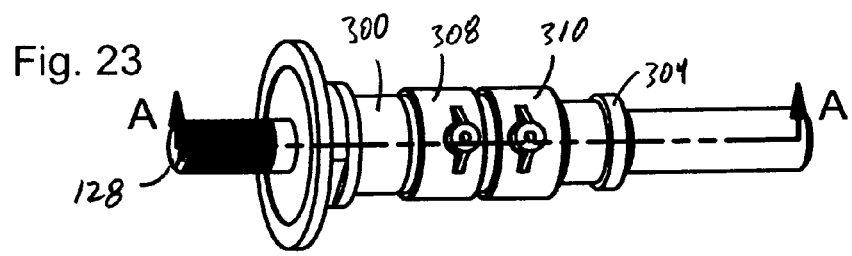
FIG. 23 shows the arbor assembly of FIG. 22 with an electrode sheath removed.
Figure 24:
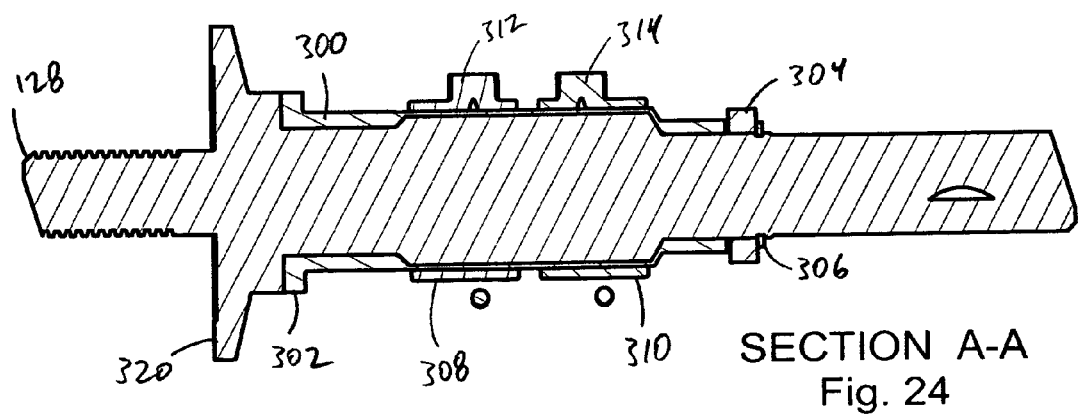
FIG. 24 shows a cross-sectional view of the arbor assembly shown in FIG. 23.

FIGS. 22 through 24 show an alternative arbor assembly. In this alternative, arbor 128 is over-molded with a hard, non-conductive material like bulk molding compound. The over-molding is shown at 300. The over-molding takes the place of insulating bushings 282 and 284 discussed above, and provides bearing seats for the two bearings that support the arbor. The over-molding includes a flange 302 to prevent the side of the main arbor bearing (bearing not shown) from contacting the arbor. A non-conductive washer 304 is positioned on the end of the arbor opposite flange 302, adjacent the side of the small arbor bearing (bearing not shown), and a retaining clip 306 holds washer 304 against the small bearing. Over-molding 300 completely encircles arbor 128 and extends from flange 302 to bearing 304, and serves to electrically isolate the arbor and blade from the rest of the saw.

Two electrodes 308 and 310 encircle but do not touch the over-molded arbor. Electrodes 308 and 310 are conductive and may be made from powder metal. The electrodes are electrically connected to the control system of the saw at screw bosses 312 and 314, respectively. The electrodes are held in place by electrode shell 316. Electrode shell 316 is molded from plastic, and it includes two halves that snap together to encompass and hold the electrodes. The electrode shell, in turn, is held in the arbor block as described above for electrode shell 290.

An advantage of the arbor assembly shown in FIGS. 22 through 24 is that the over-molding insulates the electrodes from the arbor. That insulation allows the arbor to be closer to the electrodes than it otherwise could be. Without the over-molding, the electrodes would have to be spaced a sufficient distance away from the arbor to prevent the arbor from ever touching an electrode, and to minimize the chance of a small piece of conductive material getting between the electrodes and arbor and conductively coupling them. If the arbor touched or electrically coupled to an electrode, then the signal on the arbor and blade would change, and the detection subsystem and control system could interpret that change as a person touching the blade and then trigger the brake. The over-molding between the arbor and electrodes insulates the arbor and eliminates the possibility of the arbor touching or electrically coupling to an electrode. Thus, the over-molding on the arbor may be closer to the electrodes than the arbor alone could be. Having the over-molded arbor closer to the electrodes results in a better capacitive coupling between the arbor and electrodes, and improves the ability to impart a signal to the arbor and blade and to monitor that signal.

As shown in FIG. 24, the arbor directly below the electrodes has an increased diameter. Increasing the diameter of the arbor increases the surface area of the arbor under the electrodes making the capacitive coupling larger. The bulk molding compound in the gap between the arbor and electrodes also acts as a dielectric to improve significantly the capacitive coupling. It also may be advantageous to include a layer of another dielectric or other material such as Kynar, for example, between the electrodes and arbor to further enhance the capacitive coupling. With the arbor assembly shown in FIGS. 22 through 24, there remains an air gap between the outer surface of the over-molding and the inner surface of the electrodes of approximately 0.005 to 0.007 inches.

The arbor assemblies shown in FIGS. 20 through 24 are mounted to spin in the arbor block. The blade is mounted on the end of the arbor adjacent flange 320, and secured with a washer and nut, as is known in the art. FIGS. 20 and 21 also show pulley 126 around which belt 122 extends to transfer power from the motor to spin the arbor.

Figure 25:
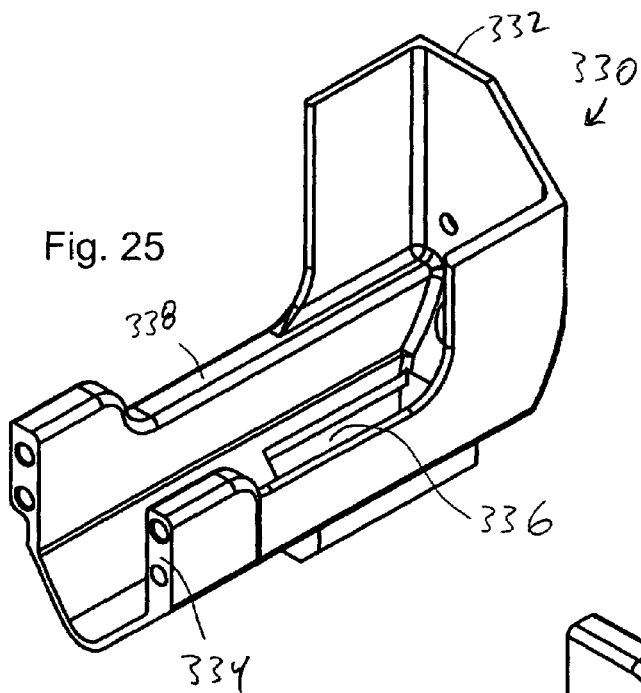
FIG. 25 shows an alternative trunnion brace.
Figure 26:
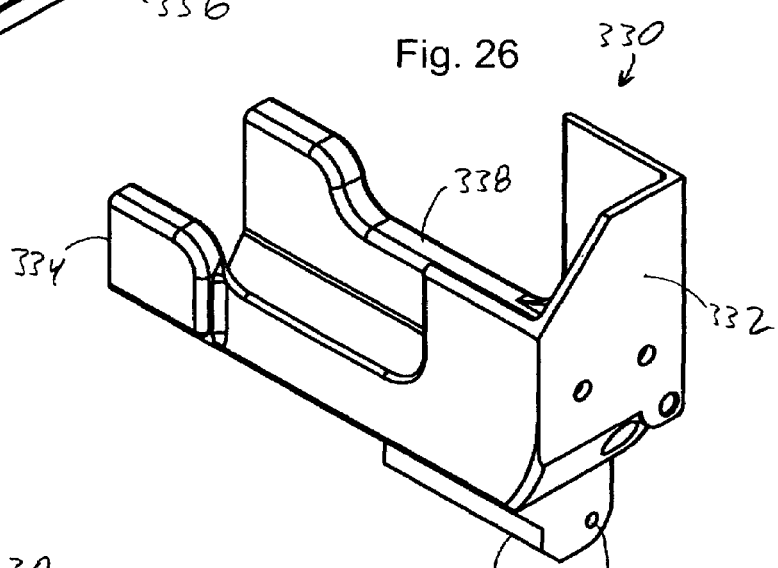
FIG. 26 shows another view of the alternative trunnion brace of FIG. 25.
Figure 27:
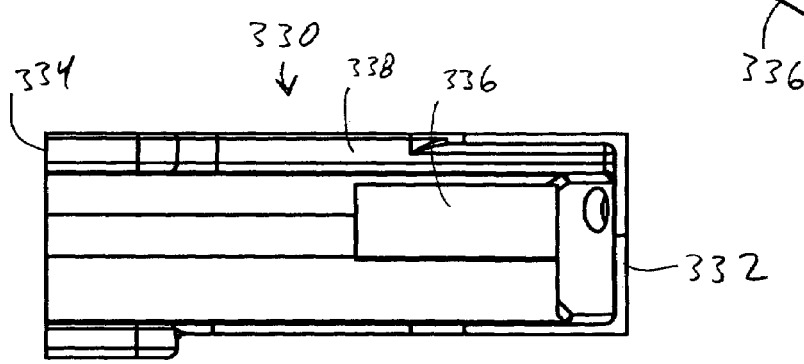
FIG. 27 shows a top view of the alternative trunnion brace of FIG. 25.

FIGS. 25 through 27 show a trunnion brace 330 that may be used as an alternative to shafts 140 and 142 (as shown in FIGS. 4 through 9) to connect front trunnion 138 and rear trunnion 136. End 332 bolts to the front trunnion, and end 334 bolts to the rear trunnion. Trunnion brace 330 is configured to shroud the portion of the blade under the table to help prevent a person from accidentally contacting the blade under the table. This is especially applicable if the blade is designed to retract. If a person accidentally touches a spinning blade under the table and the blade retracts, the person may be more severely injured because the retraction would move the blade down. Shrouding the blade minimizes that risk.

Trunnion brace 330 may be made of cast iron and should be strong enough to rigidly connect the front and rear trunnions. Trunnion brace 330 also includes a surface 338 against which a retracting arbor block may impact. Surface 338 must be sufficiently strong to withstand the impact of the retracting arbor block, and that is why the surface is larger and wider than the corresponding surface on the opposite side of the trunnion brace. Of course, the bumper discussed above that helps cushion the impact of the retracting arbor block may be mounted on surface 338.

Trunnion brace 330 also acts to help collect sawdust. As the blade cuts, much of the resulting dust will be caught by the trunnion brace. The trunnion brace is provided with an opening 336 in the bottom to which a vacuum or other dust collection system may be attached to evacuate the dust.

Figure 28:
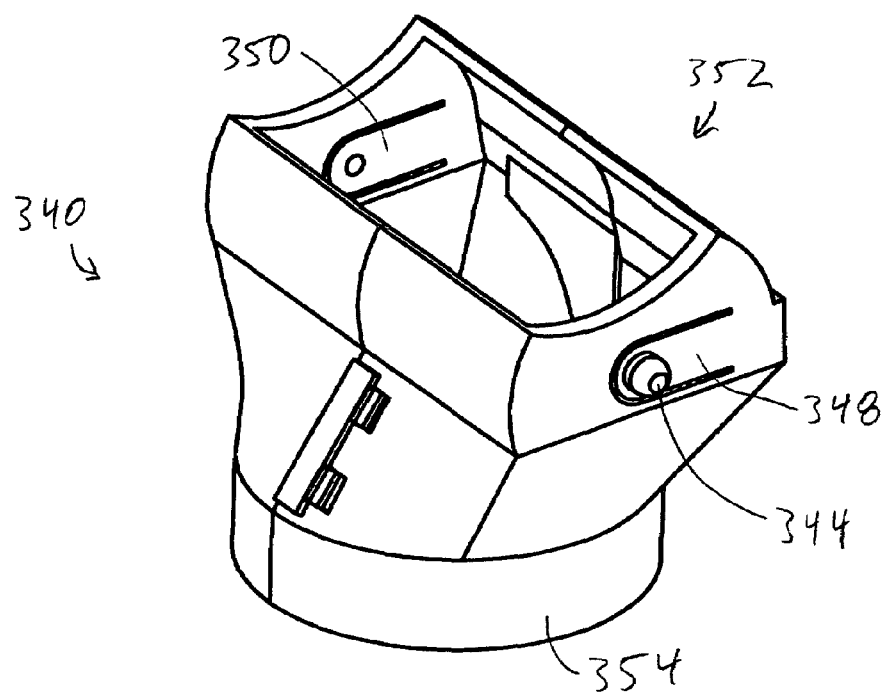
FIG. 28 is a perspective view of a pivoting coupler that may be used in a dust collection system.
Figure 29:
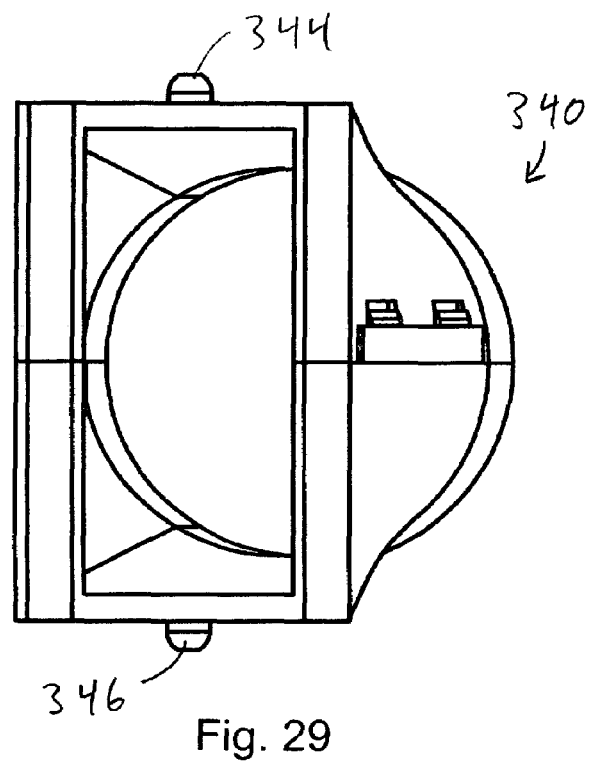
FIG. 29 shows a top view of the pivoting coupler shown in FIG. 28.

Opening 336 in trunnion brace 330 is shaped to accept pivoting coupler 340 shown in FIGS. 28 and 29. When a user adjusts the tilt of the blade, the trunnion brace will tilt from side to side. A pivoting coupler allows a vacuum hose to remain connected to the trunnion brace as the trunnion brace tilts. Coupler 340 includes two bumps 344 and 346 that mount into holes like hole 342 on the trunnion brace. The bumps are positioned on tabs 348 and 350, and the coupler is molded from plastic, so tabs 348 and 350 allow the bumps to be depressed to mount the coupler on the trunnion brace. The tabs also provide some spring force to hold the bumps in their respective holes. Coupler 340 will then pivot on bumps 344 and 346. Upper section 352 of the coupler is shaped so that it extends into opening 336 as the coupler pivots. Bottom section 354 of the coupler is annular so that a vacuum hose or other conduit can be easily attached.

The structure disclosed above for a right-tilt saw may be mirrored for implementation in a left-tilt saw.

Industrial Applicability

The systems and components disclosed herein are applicable to power equipment, and specifically to woodworking equipment such as table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a cutter;
   a conductive arbor on which the cutter is mounted;
   overmolding on at least a portion of the arbor;
   a detection system adapted to detect a dangerous condition between a user and the cutter, where the detection system includes at least one electrode positioned adjacent the arbor and where the overmolding electrically insulates the electrode from the arbor;
   a reaction system adapted to perform a specified action to mitigate the dangerous condition upon detection of the dangerous condition by the detection system; and
   at least one bearing to support the arbor;
   where the overmolding provides a bearing seat for the bearing.

2. The woodworking machine of claim 1 where the overmolding includes a flange adapted to insulate one side of the bearing.

3. A woodworking machine comprising:
   a cutter;
   a conductive arbor on which the cutter is mounted;
   overmolding on at least a portion of the arbor;
   a detection system adapted to detect a dangerous condition between a user and the cutter, where the detection system includes at least one electrode positioned adjacent the arbor and where the overmolding electrically insulates the electrode from the arbor; and
   a reaction system adapted to perform a specified action to mitigate the dangerous condition upon detection of the dangerous condition by the detection system;
   where the woodworking machine further includes at least two bearings to support the arbor and where the overmolding provides bearing seats for the two bearings.

4. The woodworking machine of claim 3 where the bearing seats are of different sizes.

5. The woodworking machine of claim 3 where the overmolding includes a flange adapted to insulate one side of one bearing, and further comprising a non-conductive washer positioned on the arbor adjacent one side of another bearing.

6. The woodworking machine of claim 5 further comprising a retaining clip adapted to hold the non-conductive washer in place.

7. A woodworking machine comprising:
   a cutter;
   a conductive arbor on which the cutter is mounted;
   overmolding on at least a portion of the arbor;
   a detection system adapted to detect a dangerous condition between a user and the cutter, where the detection system includes at least one electrode positioned adjacent the arbor and where the overmolding electrically insulates the electrode from the arbor; and
   a reaction system adapted to perform a specified action to mitigate the dangerous condition upon detection of the dangerous condition by the detection system;

where the overmolding and electrode are positioned with an air gap of approximately 0.005 to 0.007 inches or 0.13 to 0.18 mm.

8. A woodworking machine comprising:

a cutter;

a conductive arbor on which the cutter is mounted;

overmolding on at least a portion of the arbor;

a detection system adapted to detect a dangerous condition between a user and the cutter, where the detection system includes at least one electrode positioned adjacent the arbor and where the overmolding electrically insulates the electrode from the arbor; and a reaction system adapted to perform a specified action to mitigate the dangerous condition upon detection of the dangerous condition by the detection system;

where the overmolding has at least one section with a radial thickness different from the radial thickness of another section of the overmolding.

* * * * *